US011195201B1

(12) United States Patent
Li

(10) Patent No.: US 11,195,201 B1
(45) Date of Patent: Dec. 7, 2021

(54) PROMOTION OFFERING SYSTEM ANALYZING COLLECTIONS OF PROMOTIONS

(71) Applicant: Groupon, Inc., Chicago, IL (US)

(72) Inventor: Xiaolei Li, Sunnyvale, CA (US)

(73) Assignee: Groupon, Inc., Chicago, IL (US)

(*) Notice: Subject to any disclaimer, the term of this patent is extended or adjusted under 35 U.S.C. 154(b) by 0 days.

(21) Appl. No.: 13/838,415

(22) Filed: Mar. 15, 2013

Related U.S. Application Data

(60) Provisional application No. 61/663,508, filed on Jun. 22, 2012.

(51) Int. Cl.
*G06Q 30/02* (2012.01)

(52) U.S. Cl.
CPC .............................. *G06Q 30/0243* (2013.01)

(58) Field of Classification Search
CPC ........... G06Q 30/0243; G06Q 30/0269; G06Q 30/02–0277
USPC ........................................... 705/14.42, 14.66
See application file for complete search history.

(56) References Cited

U.S. PATENT DOCUMENTS

| | | | | |
|---|---|---|---|---|
| 7,334,092 B1* | 2/2008 | Wang | ................... | G06F 11/3447 711/158 |
| 8,538,957 B1* | 9/2013 | Zhou | ................... | G06F 17/2854 707/728 |
| 2002/0026386 A1* | 2/2002 | Walden | ................... | G06Q 30/02 705/14.39 |
| 2009/0030779 A1* | 1/2009 | Tollinger | ................ | G06Q 30/02 705/14.1 |
| 2009/0043645 A1* | 2/2009 | Barnett | ................ | G06Q 20/108 705/14.38 |
| 2010/0114678 A1* | 5/2010 | Axe | ........................ | G06Q 10/06 705/14.1 |
| 2010/0145763 A1* | 6/2010 | Swanson, Sr. | ................... | 705/10 |
| 2011/0153412 A1* | 6/2011 | Novikov et al. | ........... | 705/14.42 |
| 2011/0153413 A1* | 6/2011 | Chunilal | ..................... | 705/14.42 |
| 2012/0004943 A1* | 1/2012 | Reichman | ............ | G06Q 10/109 705/7.24 |
| 2012/0173310 A1* | 7/2012 | Groetzinger | ....... | G06Q 30/0283 705/14.1 |
| 2012/0226540 A1* | 9/2012 | Batalion | ................ | G06Q 30/06 705/14.23 |
| 2013/0097005 A1* | 4/2013 | Yang | .................. | G06Q 30/0207 705/14.39 |

(Continued)

FOREIGN PATENT DOCUMENTS

WO    WO-02088880 A2 * 11/2002 ......... G06F 16/9537

OTHER PUBLICATIONS

Business Wire, "GoTo.com Teams With Netscape as Premier Search Provider for Popular Netscape Net Search Program," Jul. 1, 1999, p. 1356. (Year: 1999).*

(Continued)

*Primary Examiner* — Raquel Alvarez
(74) *Attorney, Agent, or Firm* — Alston & Bird LLP

(57) ABSTRACT

A number of promotions that share a common attribute may be grouped into a common promotion collection. A promotion collection may then be analyzed to determine a score for the promotion collection. A number of promotion collections may be compared against each other based on a respective score for each promotion collection, and a number of promotion collections may be selected based on the comparison.

30 Claims, 12 Drawing Sheets

(56) References Cited

U.S. PATENT DOCUMENTS

2013/0268328 A1* 10/2013 Kurapati ............ G06Q 30/0207
705/14.1

OTHER PUBLICATIONS

U.S. Appl. No. 13/411,502, filed Mar. 2, 2012, first named inventor: O'Brien.
U.S. Appl. No. 13/460,745, filed Apr. 30, 2012, first named inventor: Gilfanov.
U.S. Appl. No. 61/695,857, filed Aug. 31, 2012, first named inventor: Aggarwal.

* cited by examiner

PROMOTION OFFERING SYSTEM ANALYZING COLLECTIONS OF PROMOTIONS

REFERENCE TO RELATED APPLICATION

This application claims the benefit of U.S. Provisional Application No. 61/663,508, filed Jun. 22, 2012, the entirety of which is hereby incorporated by reference herein.

FIELD OF THE INVENTION

The present description relates to offering promotions associated with a product or a service. This description more specifically relates to grouping promotions into promotion collections, and analyzing the promotion collections in order to determine which promotion(s) to offer to a consumer.

DESCRIPTION OF THE RELATED ART

Merchants typically offer promotions to consumers from time to time in order to generate more business. The promotions offered may be in the form of discounts, deals, rewards or the like. Often times, there are a multitude of promotions that may be offered to the consumer, with the promotions potentially being of different types (e.g., a restaurant promotion versus a spa promotion). Given the multitude and different types of promotions that may be offered, it may be difficult to determine which promotion to offer to a consumer.

SUMMARY OF THE INVENTION

An apparatus and method for analyzing collections of promotions is disclosed.

According to one aspect, a method is disclosed for selecting one of a first promotion collection or second promotion collection to present to a consumer, where each of the promotions in the first promotion collection including a first promotion attribute and each of the promotions in the second promotion collection including a second promotion attribute. The method includes: accessing an attribute of the consumer; accessing a plurality of promotions, a first subset of the plurality of promotions including the first promotion attribute and a second subset of the plurality of promotions including the second promotion attribute; scoring, based on the attribute of the consumer, the plurality of promotions; generating a first promotion collection score based on the scores of some or all the promotions in the first subset; generating a second promotion collection score based on the scores of some or all the promotions in the second subset; comparing the first promotion collection score with the second promotion collection score; and selecting one of the first promotion collection or the second promotion collection to present to the consumer based on the comparison of the first promotion collection score with the second promotion collection score.

According to another aspect, a method is disclosed for determining whether to select a promotion collection or to select disparate promotions to present to a consumer, where each of the promotions in the promotion collection including a promotion attribute. The method includes: accessing an attribute of the consumer; accessing a plurality of promotions, a first subset of the plurality of promotions including the promotion attribute and a second subset of the plurality of promotions including the disparate promotions; scoring, based on the attribute of the consumer, the plurality of promotions; generating a promotion collection score based on the scores of some or all the promotions in the first subset; generating a disparate promotion score based on the scores of some or all the disparate promotions; comparing the promotion collection score with the disparate promotion score; and selecting one of the collection of promotions or the disparate promotions to present to the consumer based on the comparison of the promotion collection score with the disparate promotion score.

According to yet another aspect, a system is disclosed, the system configured to select one of a first promotion collection or second promotion collection to present to a consumer, where each of the promotions in the first promotion collection including a first promotion attribute and each of the promotions in the second promotion collection including a second promotion attribute. The system includes: a memory storing processor-executable instructions; and a processor in communication with the memory. The processor is configured to execute the processor-executable instructions to: access an attribute of the consumer; access a plurality of promotions, a first subset of the plurality of promotions including the first promotion attribute and a second subset of the plurality of promotions including the second promotion attribute; score, based on the attribute of the consumer, the plurality of promotions; generate a first promotion collection score based on the scores of some or all the promotions in the first subset; generate a second promotion collection score based on the scores of some or all the promotions in the second subset; compare the first promotion collection score with the second promotion collection score; and select one of the first promotion collection or the second promotion collection to present to the consumer based on the comparison of the first promotion collection score with the second promotion collection score.

According to still another aspect, a system is disclosed, the system configured to determine whether to select a promotion collection or to select disparate promotions to present to a consumer, where each of the promotions in the promotion collection including a promotion attribute. The system includes: a memory storing processor-executable instructions; and a processor in communication with the memory. The processor is configured to execute the processor-executable instructions to: access an attribute of the consumer; access a plurality of promotions, a first subset of the plurality of promotions including the promotion attribute and a second subset of the plurality of promotions including the disparate promotions; score, based on the attribute of the consumer, the plurality of promotions; generate a promotion collection score based on the scores of some or all the promotions in the first subset; generate a disparate promotion score based on the scores of some or all the disparate promotions; compare the promotion collection score with the disparate promotion score; and select one of the collection of promotions or the disparate promotions to present to the consumer based on the comparison of the promotion collection score with the disparate promotion score.

Other systems, methods, and features will be, or will become apparent to one with skill in the art upon examination of the following figures and detailed description. It is intended that all such additional systems, methods, and features included within this description, be within the scope of the disclosure, and be protected by the following claims.

BRIEF DESCRIPTION OF THE DRAWINGS

The present invention may be better understood with reference to the following drawings and description. Nonlimiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

DETAILED DESCRIPTION

Figure 1:
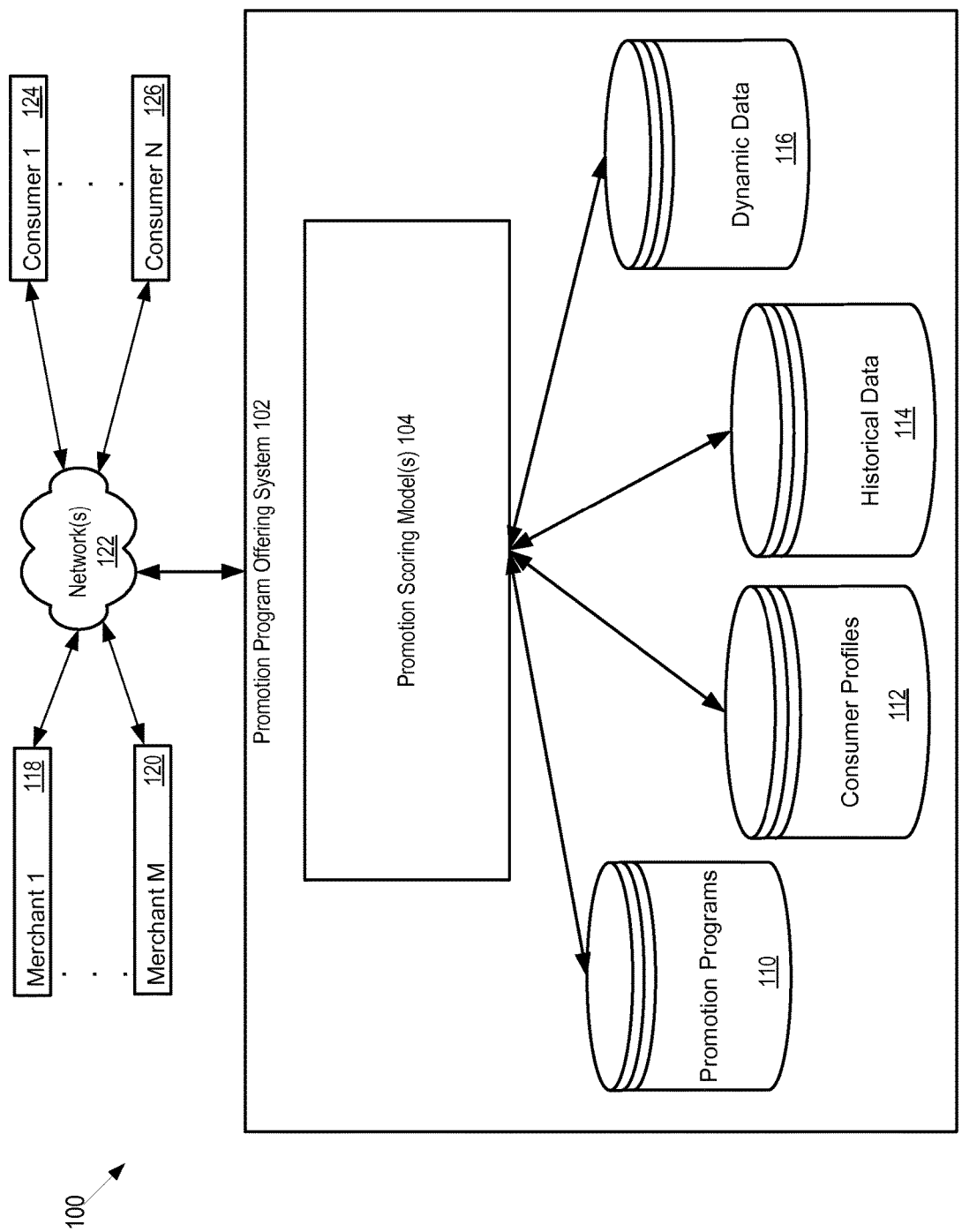
FIG. 1 illustrates a representation of a network and a plurality of devices that interact with the network to achieve a comparison of promotion collections.

The present invention as described herein may be embodied in a number of different forms. Not all of the depicted components may be required, however, and some implementations may include additional, different, or fewer components from those expressly described in this disclosure. Variations in the arrangement and type of the components may be made without departing from the spirit or scope of the claims as set forth herein.

A promotion may include any type of reward, discount, coupon, credit, deal, voucher or the like used toward part (or all) of the purchase of a product or a service. The promotion may be offered as part of a larger promotion program, or the promotion may be offered as a stand-alone one time promotion. In an effort to better distinguish and identify the promotion, the promotion may include one or more attributes, such as the merchant offering the promotion (e.g., "XYZ coffee shop), the location of the promotion, the amount of the promotion, the category of the promotion (such as a restaurant promotion, a spa promotion, a travel promotion, a local promotion, etc.), the subcategory of the promotion (a more granular classification of category, such as a sushi restaurant), deal types, promotion class (such as whether the promotion is directed to a "daily deals" class, to a "vacation" class, to a "goods" class), or the like. It should be noted that promotions and deals are recited in this disclosure to be understood as being interchangeable, unless specifically stated otherwise.

As discussed below, the promotion program offering system 102 may present a consumer with a promotion. In order to determine whether to send a promotion to a consumer, one or more attributes of the consumer may be examined. Consumer attributes include, but are not limited to: location (e.g., home location, work location, mobile locations); gender; age; tenure; email domain; purchase history; email interaction; website interaction; and desired deal types. Attributes of the promotion and the consumer are discussed in U.S. application Ser. No. 13/411,502 and U.S. Provisional Application No. 61/695,857, both of which are incorporated by reference herein.

The promotion program offering system 102 may present a single promotion to the consumer, or may present multiple promotions in an electronic communication to the consumer. The electronic communication may comprise, without limitation, an email, SMS text message, webpage inbox message, VOIP voice message, real-time webpage content presentation, mobile push notifications or other similar types of electronic correspondences. When presenting multiple promotions to the consumer, in one embodiment, the promotion program offering system 102 may select one program collection, from a plurality of program collections, to present to a consumer. A promotion collection may comprise a set of promotions that share one or more common attributes, such as one or more common promotion attributes (e.g., same category and/or subcategory, same deal type, same general location, same promotion class, etc.), one or more common consumer attributes, and/or one or more common derived attributes (e.g., within the same range, such as 0-2 miles, from the consumer's home location or work location). In certain instances, presenting a consumer with a promotion collection, which includes multiple promotions tied together by common attribute(s), results in a synergy and may increase the probability that the consumer will purchase one of the promotions in the collection.

In this regard, the promotion program offering system 102 is configured to identify a plurality of promotion collections, and then evaluate part or all of the identified promotion collections in order to determine which promotion collection(s) to present to the consumer. As discussed in more detail below, the promotion program offering system 102 may identify one or more attributes, such as one or more promotion attributes, one or more consumer attributes, and/or one or more derived attributes, and access the promotions that share the identified attribute(s).

Identification of the one or more attributes may be independent of, or dependent on, the consumer. For example, identification of the one or more attributes may be predefined, such as predefined themes or attributes. Predefined themes or attributes include, without limitation, local deals (e.g., "local favorites"), travel deals, goods deals, holiday deals (e.g., Mother's day deals), short-term exclusive promotions, specific types of deals (e.g., "coffee & treats"), etc. The predefined themes or attributes may be selected independent of the consumer, or may be selected dependent on an aspect of the consumer, such as the consumer's previous purchases.

Identification of the one or more attributes may also be based on the consumer's input (or lack of input), based on analysis of the consumer's profile, or a combination of both. For example, the consumer may provide explicit input as to the promotions desired, such as in the form of a desired type of deal (e.g., a consumer explicitly states a desire for promotions with the "family friendly" deal type). As another example, the consumer may provide implicit input. Implicit input may include the consumer's interaction with the promotion program offering system 102. Examples of implicit input include, but are not limited to: what emails the consumer opens; what links that the consumer accesses in the electronic communication; what searches the consumer performs on the promotion program website; what webpages the consumer accesses; and what promotions the consumer purchases.

In this regard, the promotion program offering system 102 may access the consumer's interaction with the system in order to identify one or more attributes, such as promotion attributes. As merely a few examples, the promotion program offering system 102 may: identify the deal tag(s) the consumer identified as of interest; identify what type of emails the consumer opens (e.g., emails directed to different promotion classes, such as directed to the daily deals promotion class, directed to the vacation promotion class, directed to the goods promotion class, etc.); identify the categories, subcategories, and/or deal types of the promotions that the consumer accesses when activating a link in an email sent from the promotion program offering system; correlate the consumer's search terms submitted in a query to the promotion program website to categories, subcategories, and/or deal types; identify the promotion classes, categories, subcategories, and/or deal types of the promotions that the consumer accesses on the promotion program website; identify the promotion classes, categories, subcategories, and/or deal types of the promotions that the consumer purchases; and identify a consumer location (such as a consumer's home location, a consumer's work location, or a consumer's current location) in order to identify promotions that are within a predetermined distance from the identified location. Alternatively, if the promotion program offering system 102 has a lack of consumer input, the promotion program offering system 102 may identify another attribute, such as "top selling promotions".

The promotion program offering system 102 may determine a relevant attribute of the consumer in order to present a personal collection with a single theme relevant to a consumer. More specifically, themes may be generated based on the consumer's past purchase(s) or based on predefined collections, such as "daily deals favorites", "goods favorites", "local favorites", and "coffee & treats".

After attribute(s) are identified, the promotion program offering system 102 may analyze part (or all) of the promotions with the identified attribute(s) in order to determine which promotion collection(s) to present to a consumer. As discussed in more detail below, the analysis of the promotion collections may comprise: scoring some (or all) of the promotions in the promotion collection; and analyzing the scores (such as generating a mean, a median, standard deviation of some or all of the scores). The promotion collection score may be based on the scores of all (or less than all) of the promotions in the promotion collection. For example, the promotion collection score associated with a specific promotion collection may be based on all of the scores of the promotions in the promotion collection (such as a mean generated using the scores of all of the promotions in the promotion collection) or may be based on less than all of the scores of the promotions in the promotion collection (such as a mean generated using the scores of the top ranked promotions in the promotion collection (e.g., the promotions with the highest 5 scores)).

In one embodiment, all of the available promotions may be scored first, and then the analysis of the scores may be performed one personal collection at a time. In an alternate embodiment, the promotion program offering system 102 may iteratively select attribute(s) to identify a specific personal collection, score only the promotions having selected attribute(s), and then analyze the scores of the promotions having the selected attribute(s). Based on the analysis of the promotion collections, the promotion program offering system 102 may select one or more personal collections to present to the consumer (such as the highest ranked personal collection, or the top-3 ranked personal collections).

In this regard, grouping promotions into separate promotion collections enables comparison of the promotions that share a common characteristic or attribute. Analysis of multiple collections of promotions thus enables selection of one or more of the multiple collections, and in turn enables presentation of one or more promotions from the selected collection(s), as discussed in more detail below.

In an alternate embodiment, when presenting multiple promotions to the consumer, the promotion program offering system 102 may determine whether to present disparate promotions, or promotion collection(s) to the consumer. Disparate promotions may comprise dissimilar promotions, such as promotions that are top-ranked by the promotion program offering system 102 for the consumer. As discussed above, the promotions may be scored based on one or more consumer attributes. In order to determine whether to present the disparate promotions or the promotion collection(s), the promotion program offering system 102 may generate a disparate promotion score and a promotion collection(s) score, respectively. For example, the disparate promotion score may be based on the individual scores of the disparate promotions (such as an average of the individual scores). Likewise, the promotion collection score may be based on the individual scores of some (or all) of the promotions in the promotion collection. In one specific example, in the event that a predetermined number of promotions is presented to the consumer (e.g., 5 promotions), the disparate promotions with the top 5 scores may be used to generate the disparate promotion score, and the promotions in the promotion collection with the top 5 scores may be used to generate the promotion collection score.

The promotion program offering system 102 may compare the disparate promotion score with the promotion collection score in order to determine which to select to present to the user. In one embodiment, the promotion program offering system 102 may determine whether the promotion collection score is within a range of the disparate promotion score. If the adjusted promotion collection score is within the range of the disparate promotion score, some or all of the promotions in the promotion collection are presented to the consumer; otherwise, the disparate promotions are presented to the consumer. The range may be fixed or may vary. For example, the range may vary depending on the promotion collection, depending on one or more attributes of the consumer, or both. For example, the breadth of the range may be based on the category or subcategory of the promotion collection. As another example, the breadth of the range may be based on whether the promotion collection relates to a previous action of the consumer, such as whether the promotion collection is related to one or more of the following: links that the consumer accessed in the electronic communication; searches that the consumer performed on the promotion program website; webpages that the consumer accessed; and promotions that the consumer purchased.

In an alternate embodiment, the promotion program offering system 102 may adjust one, or both, of the disparate promotion score or the promotion collection score prior to determining which to select to present to the user. As one example, the promotion program offering system 102 may adjust (e.g., increase) the promotion collection score. The adjusted promotion collection score may be compared with the disparate promotion score. If the adjusted promotion collection score is greater than the disparate promotion score, some or all of the promotions in the promotion collection are presented to the consumer; otherwise, the disparate promotions are sent to the consumer. The amount of the adjustment of the promotion collection score may be fixed or may vary. For example, the amount may vary depending on the promotion collection, depending on one or more attributes of the consumer, or both. For example, the amount of adjustment may be based on the category or subcategory of the promotion collection. As another example, the amount of adjustment may be based on whether the promotion collection relates to a previous action of the consumer, such as whether the promotion collection is related to one or more of the following: links that the consumer accessed in the electronic communication; searches that the consumer performed on the promotion program website; webpages that the consumer accessed; and promotions that the consumer purchased.

As another example, the promotion program offering system 102 may adjust (e.g., decrease) the disparate promotion score. The adjusted disparate promotion collection score may be compared with the promotion collection score. If the adjusted disparate promotion score is greater than the promotion collection score, the disparate promotions are presented to the consumer; otherwise, some or all of the promotions in the promotion collection are presented to the consumer. Similar to the adjustment for the promotion collection score, the amount of the adjustment of the disparate promotion score may be fixed or may vary.

FIG. 1 illustrates an overview for a promotion system 100 configured to offer promotions for promotion programs. The promotion system 100 includes a promotion program offering system 102, which communicates via one or more networks 122 with consumers, such as consumer 1 (124) to consumer N (126), and with merchants, such as merchant 1 (118) to merchant M (120). The promotion program offering system 102 includes a promotion scoring model 104, which may include one or more different models for scoring promotions. A promotion score may be generated by the promotion scoring model 104 for each promotion in the promotion system 100 with respect to a particular consumer. The promotion score of a promotion is an indication of a probability that the particular consumer in the promotion system 100 will accept the promotion.

To accomplish the generation of promotion scores, the promotion scoring model 104 communicates with multiple databases that are part of the promotion program offering system 102 such as a promotion program database 110, consumer profiles database 112, historical data database 114 and dynamic data database 116. So with respects to the particular consumer, the promotion scoring model 104 may access the databases 110, 112, 114 and 116 in order to obtain specific attribute information on the particular consumer and the various promotions. As described throughout this disclosure, various attributes may be associated or assigned to a promotion and a consumer in the promotion system 100. Then the obtained attribute information may be utilized to generate promotion scores for each promotion with respects to the particular consumer, where the promotion scores are an indication of a probability that the particular consumer will accept an offer from a respective promotion. An example of scoring of promotions is disclosed in U.S. application Ser. No. 13/411,502, incorporated by reference herein in its entirety.

The promotion programs database 110 is responsible for storing data detailing various promotions and promotion programs that are available for offer in the promotion program offering system 102. In order to input promotion program information into the promotions program database 110, merchants may optionally communicate via the networks 122 with the promotion program offering system 102 to input the information detailing the various promotion program offerings.

The consumer profiles database 112 includes profiles for the consumers, consumer 1 (124) to consumer N (126), that are included in the promotion system 100. The consumer attributes information detailed for a specific consumer stored in the consumer profiles database 112 may include, but is not limited to, name, age, address (e.g., home address, work address, etc.), occupation, educational background, previously accepted promotion program offerings, previously rejected promotion program offerings, gender and the like. Any one, some or all of the attributes of the consumer may be used by the promotion offering system 102 in determining whether to offer a promotion to a consumer.

Consumer attributes stored in the consumer profiles database 112 may also be referenced to create personal promotion collections that relate to a particular consumer. So unlike the predetermined promotion collections described previously that may be viewed or presented to all consumers, personal promotion collections may be created to cater to a particular consumer.

For instance, a particular consumer may have a consumer attribute that indicates the particular consumer lives in a particular location (such as certain neighborhood). In response to this attribute, the promotion program offering system 102 may create a personal collection for the particular consumer that is comprised of promotions that exist in the particular consumer's neighborhood (e.g., local deals). Or, the particular consumer may have a consumer attribute that indicates the particular consumer has bought Italian restaurant promotions in the past. Given the particular consumer's past purchase history, the promotion program offering system 102 may create a personal collection for the particular consumer that is comprised of Italian restaurant promotions. In this way, a consumer's attribute information may be referenced to create a personal promotion collection that is tailored to the consumer.

The creation of a program collection may be accomplished in one of several ways. In one way, the promotion program offering system 102 may store in a database an attribute or other indicator of the program collection (such as a look-up table correlating the identity of the particular consumer to the consumer attribute), and thereafter use the attribute or other indicator when searching the promotion programs database 110 to identify promotion programs for the personal collection. In another way, the promotion program offering system 102 may create a program collection by storing promotions in the program collection in a separate database (or section of the database) associated with the program collection.

The historical data database 114 includes information detailing the past performance of promotion program offerings that have been presented in the promotion program system 102 in previous time periods. The historical data database 114 may include, but is not limited to, rates of acceptances of specific promotion programs, attributes of consumers that accepted or rejected specific promotion programs, and the like.

The dynamic data database 116 includes information detailing the past performance of a promotion program offering that is currently active in the promotion offering system 102. So that, while a promotion program referenced in the dynamic data database 116 is currently active, the data stored in the dynamic data database 116 may pertain to performance data of the active promotion program from a previous time period.

Although FIG. 1 has been illustrated to show separate databases 110, 112, 114 and 116, FIG. 1 has been illustrated for demonstrative purposes only, and it is contemplated to have the databases 110, 112, 114 and 116 arranged in any combination of one or more memories/storage units.

Figure 2:
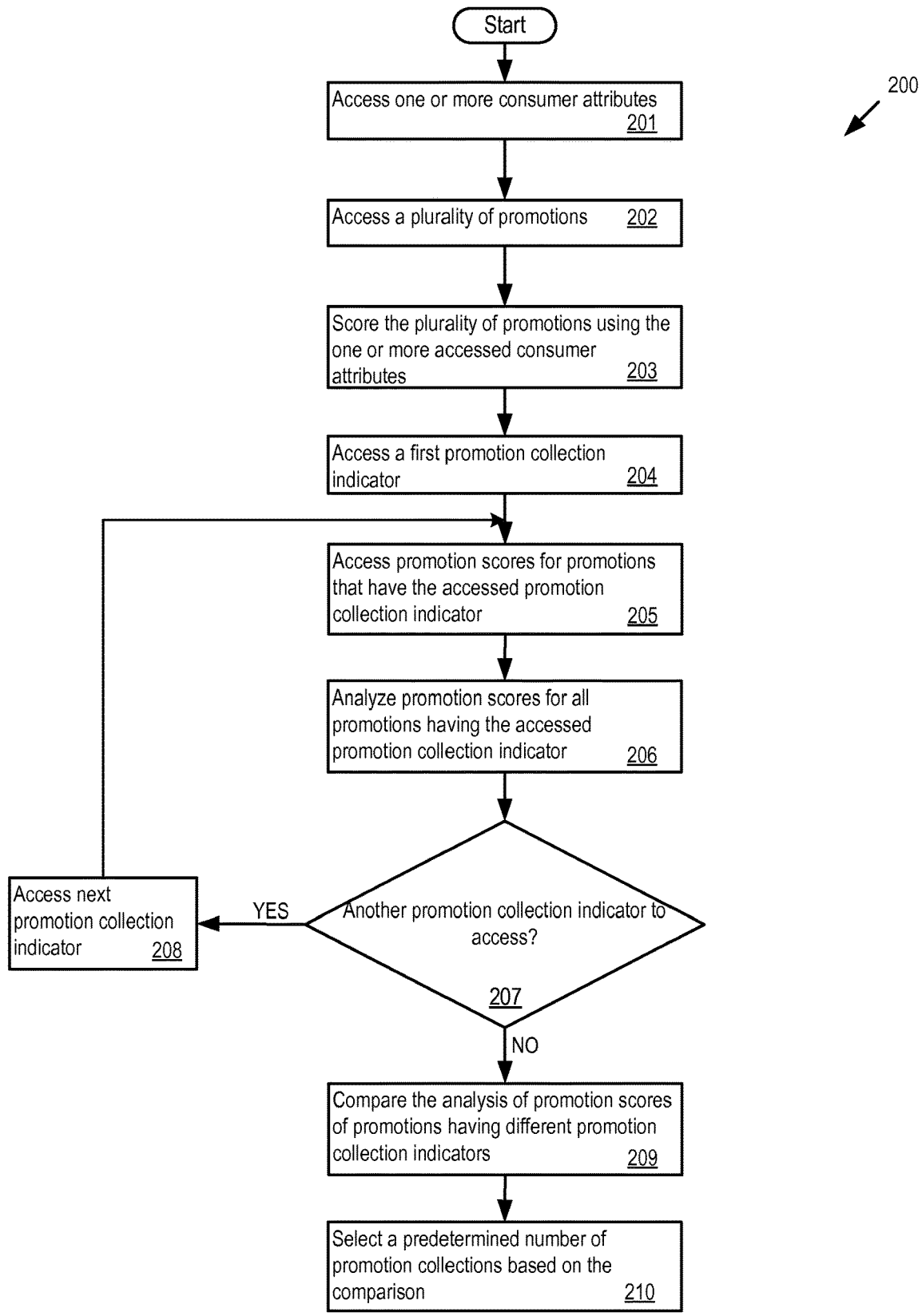
FIG. 2 illustrates a flow chart describing an overview of an analysis of promotion collections.

FIG. 2 illustrates a flow chart 200 to analyze promotion collections, compare the analyzed promotion collections and select one or more promotion collection(s) based on the comparison. The logic 200 may be implemented in hardware, software, or a combination of both. For example, the promotion scoring model 104 may implement the logic 200 as software to determine which promotion collection(s) to present to the consumer. As discussed above, the promotion program offering system 102 may send multiple promotions to the consumer. In one embodiment, the promotion program offering system 102 may send multiple promotions to the consumer by first selecting one or more promotion collections, and then sending one or more promotions from the selected one or more promotion collections. FIG. 2 is an example of the logic of selecting the one or more program collections.

At 201, one or more consumer attributes are accessed. As discussed above, the consumer attributes include, but are not limited to, name, age, address, occupation, educational background, previously accepted promotion program offerings, previously rejected promotion program offerings, gender and the like.

At 202, a plurality of promotions are accessed. The promotions may be accessed from one or more deal repositories. One example of a deal repository is a bank of deals, such as disclosed in U.S. Ser. No. 13/460,745, incorporated by reference in its entirety. The promotion offering system 102 may have multiple deal repositories, such as a first bank of deals in which deals are offered to consumers for a shorter period of time (such as up to 1 week) and a second bank of deals in which deals are offered to consumers for a longer period of time (such as up to 6 months). One of the banks of deals (such as the second bank of deals) may be accessed to fetch deals, with the fetched deals scored for further evaluation, as discussed below.

At 203, the plurality of promotions accessed are scored using the one or more accessed consumer attributes. As discussed herein, the promotions may be scored in a variety of ways, such as disclosed in U.S. application Ser. No. 13/411,502, incorporated by reference in its entirety. In one embodiment, the promotion program offering system 102 may iteratively access a single promotion (including the promotion attributes), and then score the promotion based on the consumer attributes and the promotion attributes. The iteration may continue until all of the plurality of promotions are scored. In an alternate embodiment, the promotion program offering system 102 may access all of the plurality of promotions (including the promotion attributes associated with each of the plurality of promotions), and then score each of the plurality of promotions based on the consumer attributes and the associated promotion attributes. In either embodiment, the plurality of promotions may be scored.

At 204, a first promotion collection indicator is accessed. As discussed above, program collections may be defined in one of multiple ways. One way is to have a program collection indicator, which may define at least one aspect of the program collection. For example, a promotion collection indicator may be associated with one or more promotions, and may correspond, either in part or in whole, to an attribute of the promotion(s). In this way, a promotion collection indicator may be considered to identify a promotion collection that is comprised of all promotions that have the common promotion collection indicator. For example, a program collection may comprise local deals. In this example, the promotion indicator may comprise an attribute that indicates a promotion is local (such as a geographic indicator).

At 205, promotion scores for promotions in the promotion program offering system 102 that have the promotion collection indicator are accessed. In the above example of a local deals collection (which includes all promotions local to the consumer), the scores for the promotions local to the consumer may be accessed. In one embodiment, the scores for the promotions associated with the promotion collection indicator are already calculated, as discussed above. So that, at 205, the previously calculated scores are accessed. In an alternate embodiment, the scores for the promotions associated with the promotion collection indicator are calculated in response to accessing the promotion collection indicator. As discussed above, one example of scoring promotions is disclosed in U.S. application Ser. No. 13/411,502, incorporated by reference herein in its entirety.

At 206, some or all promotion scores corresponding to promotions that are determined to have the accessed promotion collection indicator are analyzed. As discussed above, the promotion program offering system 102 is configured to select one or more promotion collections to present to the consumer. In order to make the selection, the promotion program offering system 102 is configured to analyze (such as statistically analyze) the scores of some (or all) of the promotions associated with the promotion program indicator. As discussed in more detail below, the promotion program offering system may then compare the analyses of the different program collections in order to determine which of the different program collections to select. The analysis of promotion scores at 206 are described in further detail with reference to FIGS. 3A-3F below.

In one embodiment, all of the promotion scores associated with the promotion program indicator are analyzed. For example, if local deals is the promotion program indicator and there are 100 local deals available, each of the scores for the 100 local deals are analyzed. In an alternative embodiment, some, but not all, of the promotion scores associated with the promotion program indicator are analyzed. In the example above, the scores for less than all of the 100 local deals available are analyzed.

The number of the promotion scores that are analyzed may be determined based on the number of promotions from the collection that will be presented to the consumer. As discussed in more detail below, after selection of the program collection, a predetermined number of promotions from the selected program collection are presented to the consumer. For example, if the predetermined number of promotions to present to the consumer is three, the promotions from the selected program collection having the top three scores may be presented to the consumer. The predetermined number of promotions presented to the consumer may affect the number of promotions analyzed. For instance, if the predetermined number of promotions to present to the consumer is three, the top three promotion scores associated with the promotion program indicator are analyzed. In this way, less than all of the promotion scores associated with the promotion program indicator are analyzed.

At 207, a determination is made as to whether there is another promotion collection indicator to be accessed. If a determination is made that another promotion collection indicator is to be accessed, a next promotion collection indicator is accessed at 208. The flow diagram 200 may then iterate by going to 205. So that, following 208, promotion scores for promotions that have the next promotion collection indicator will be obtained and analyzed in accordance to 205 and 206 as described above.

When it is determined at 207 that there are no longer any promotion collection indicators to access, the analysis of promotion scores for the different promotion collection indicators are compared at 209. As discussed in more detail below, the analysis may comprise comparing the analyses performed at 206 in order to rank the different promotion collections. In some embodiments, promotion collections that include less than a minimum threshold number of promotions may be excluded from the comparison at 209.

At 210, one or more promotion collections may be selected based on the comparison described in 209. For example, a predetermined number of program collections may be selected. The predetermined number may equal one, so that the top ranked program collection is selected for presentation to the consumer. Alternatively, the predetermined number may be greater than one (such as three) so that the three top ranked program collections are selected.

One or more, or all of the promotions from the selected promotion collection(s) from 210 may then be presented to a consumer. In particular, a predetermined number of promotions from the selected promotion collection(s) may be presented to the user. For example, in the instance where a single promotion from each selected promotion collection is presented to the consumer, the promotion program offering system 102 may select the top scored promotion from each selected promotion collection to present to the consumer. As another example, where three promotions from each selected promotion collection is presented to the consumer, the promotion program offering system 102 may select the top three scored promotions from each selected promotion collection to present to the consumer.

The one or more promotions from the selected promotion collection(s) may be presented to the consumer via a webpage, a mobile communication message, an email message or other similar form of communication. When presenting the selected promotion collection(s) to the consumer, individual promotion(s) or promotion collection(s) that have been previously presented to the consumer within a predetermined amount of time may be excluded. In some embodiments, the excluded promotion(s) or promotion collection(s) may be replaced by promotion(s) or promotion collection(s) that were not selected at 210 above. Information regarding individual promotions and promotion collections that have previously been presented to the consumer may be accessed from one or more of the databases 110, 112, 114, 116 of the promotion program offering system 102.

When presenting the selected promotion collection(s) to the consumer, a message may be provided that identifies a common attribute that defines the selected promotion collection(s).

It is noted that in some embodiments, promotion collections that include less than a minimum threshold number of promotions may not be eligible for selection at 210.

FIGS. 3A-3F illustrates flow charts describing various forms of analyses (such as statistical analyses) that may be applied to the promotion scores of the promotions that have a common promotion collection indicator. In this way, FIGS. 3A-3F illustrates flow charts describing various forms of analyses that may be applied to determine a score for a program collection. Each of FIGS. 3A-3F are exemplary expansions of 206 in FIG. 2.

Figure 3A:
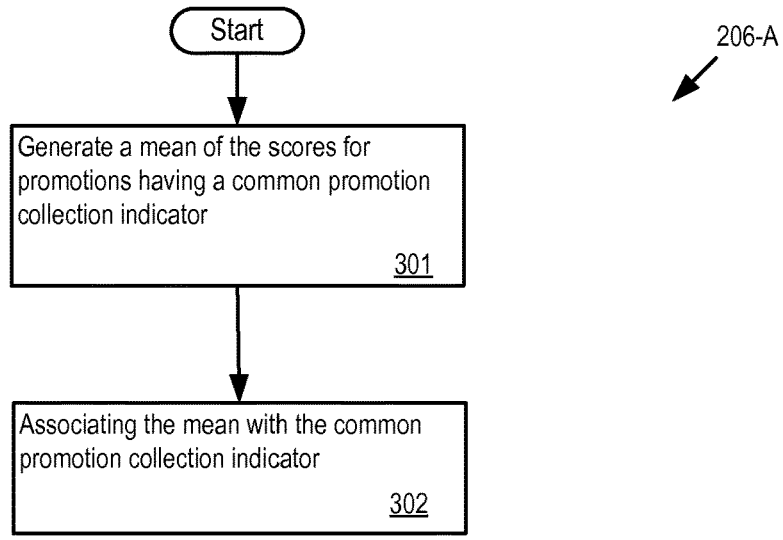
FIG. 3A illustrates a flow chart describing an analysis for generating a deal collection score for a promotion collection.

In FIG. 3A, the flow chart 206-A illustrates the analysis described in 206 of FIG. 2 to be comprised of generating a mean value from some (or all) of the promotion scores of promotions having a common promotion collection indicator at 301. The logic 206-A may be implemented in hardware, software, or a combination of both. For example, the promotion scoring model 104 may implement the logic 206-A as software to analyze the promotion scores. The common promotion collection indicator may be the accessed promotion collection indicator described in 206 of FIG. 2. At 302, the mean value that is generated at 301 may be associated with the common promotion collection indicator.

When promotion scores are analyzed in accordance to the analysis described in flow chart 206-A above, each promotion collection will have an associated analysis, such as an associated mean value that is a mean of all promotion scores for promotions within the promotion collection. At 209 in flow chart 200, the comparison of the analysis may comprise comparing or ranking the mean values associated with the different program collections. Further, at 210, the promotion collection(s) may be selected based on comparing or ranking the mean values (e.g., the highest mean of promotion scores may be selected).

Figure 3B:
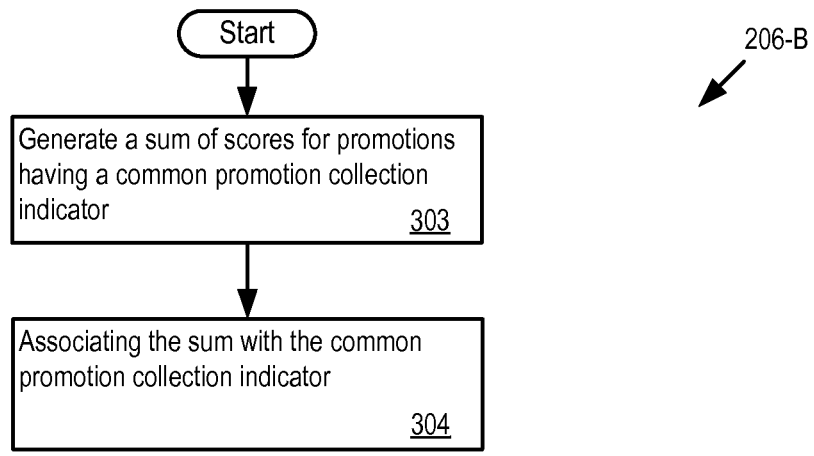
FIG. 3B illustrates a flow chart describing an analysis for generating a deal collection score for a promotion collection.

In FIG. 3B, the flow chart 206-B illustrates the analysis described in 206 of FIG. 2 to be comprised of generating a sum value from some (or all) of the promotion scores of promotions having a common promotion collection indicator at 303. The logic 206-B may be implemented in hardware, software, or a combination of both. For example, the promotion scoring model 104 may implement the logic 206-B as software to analyze the promotion scores. The common promotion collection indicator may be the accessed promotion collection indicator described in 206 of FIG. 2. At 304, the sum value that is generated at 303 may be associated with the common promotion collection indicator.

When promotion scores are analyzed in accordance to the analysis described in flow chart 206-B above, each promotion collection will have an associated analysis, such as an associated sum value that is a mean of all promotion scores for promotions within the promotion collection. At 209 in flow chart 200, the comparison of the analysis may comprise comparing or ranking the mean values associated with the different program collections. Further, at 210, the promotion collection(s) may be selected based on comparing or ranking the sum values (e.g., the highest sum of promotion scores may be selected).

Figure 3C:
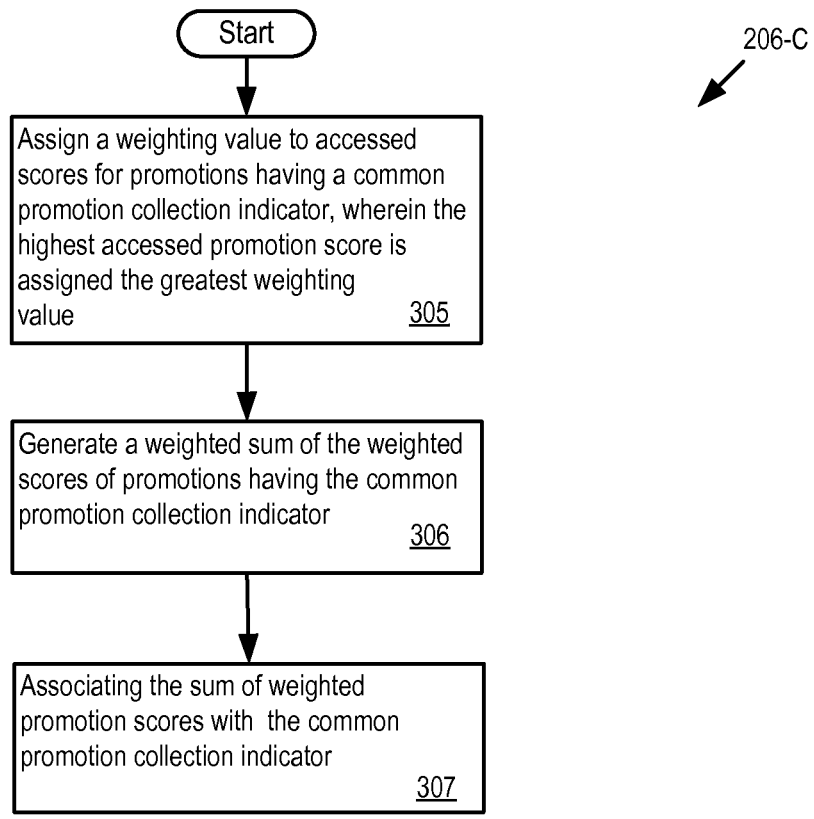
FIG. 3C illustrates a flow chart describing an analysis for generating a deal collection score for a promotion collection.

In FIG. 3C, the flow chart 206-C illustrates the analysis described in 206 of FIG. 2 to be comprised of generating a weighted sum value from some (or all) of the promotion scores of promotions having a common promotion collection indicator. The logic 206-C may be implemented in hardware, software, or a combination of both. For example, the promotion scoring model 104 may implement the logic 206-C as software to analyze the promotion scores. At 305, a weighting value is assigned to each of the promotion scores. The weighting values may be assigned such that the highest obtained promotion score out of all of the accessed promotion scores is assigned the greatest weighting value. Then each subsequent promotion score in order of descending promotion score, may be assigned a subsequently lower weighting value. At 306, a weighted sum value from all of the weighted promotion scores will be generated. The common promotion collection indicator may be the accessed promotion collection indicator described in 206 of FIG. 2. At 307, the weighted sum value that is generated at 306 may be associated with the common promotion collection indicator.

When promotion scores are analyzed in accordance to the analysis described in flow chart 206-C above, each promotion collection will have an associated analysis, such as an associated weighted sum value that is a weighted sum of all promotion scores for promotions within the promotion collection. At 209 in flow chart 200, the comparison of the analysis may comprise comparing or ranking the weighted sum values associated with the different program collections. Further, at 210, the promotion collection(s) may be selected based on comparing or ranking the weighted sum values (e.g., the highest weighted sum of promotion scores may be selected).

Figure 3D:
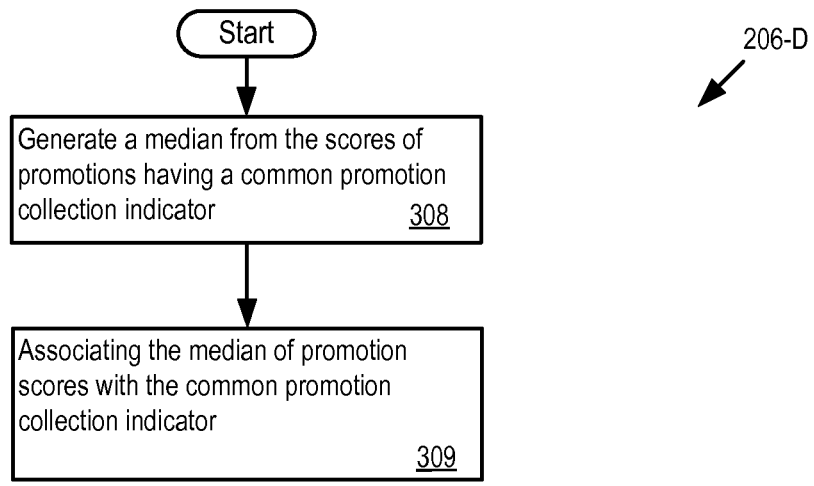
FIG. 3D illustrates a flow chart describing an analysis for generating a deal collection score for a promotion collection.

In FIG. 3D, the flow chart 206-D illustrates the analysis described in 206 of FIG. 2 to be comprised of generating a median value from some (or all) of the promotion scores of promotions having a common promotion collection indicator at 308. The logic 206-D may be implemented in hardware, software, or a combination of both. For example, the promotion scoring model 104 may implement the logic 206-D as software to analyze the promotion scores. The common promotion collection indicator may be the accessed promotion collection indicator described in 206 of FIG. 2. At 309, the median value that is generated at 308 may be associated with the common promotion collection indicator.

When promotion scores are analyzed in accordance to the analysis described in flow chart 206-D above, each promotion collection will have an associated analysis, such as an associated median value that is a median of all promotion scores for promotions within the promotion collection. At 209 in flow chart 200, the comparison of the analysis may comprise comparing or ranking the median values associated with the different program collections. Further, at 210, the promotion collection(s) may be selected based on comparing or ranking the median values (e.g., the highest median of promotion scores may be selected).

Figure 3E:
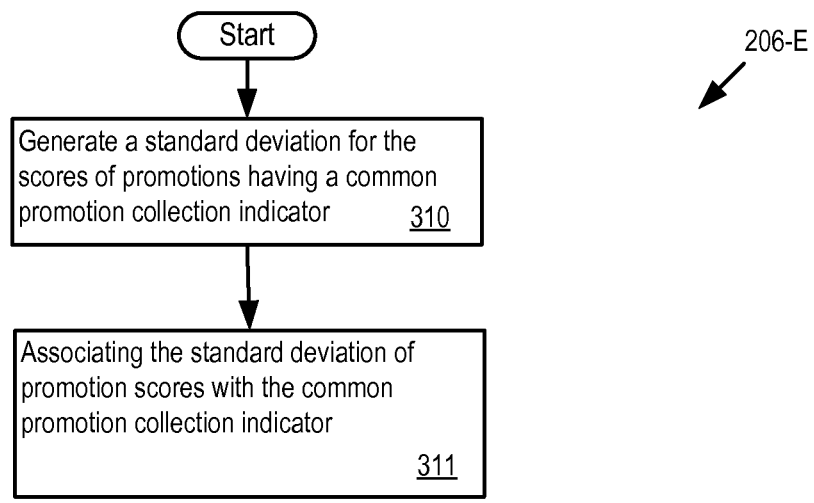
FIG. 3E illustrates a flow chart describing an analysis for generating a deal collection score for a promotion collection.

In FIG. 3E, the flow chart 206-E illustrates the analysis described in 206 of FIG. 2 to be comprised of generating a standard deviation analysis from some (or all) of the promotion scores of promotions having a common promotion collection indicator at 310. The logic 206-E may be implemented in hardware, software, or a combination of both. For example, the promotion scoring model 104 may implement the logic 206-E as software to analyze the promotion scores. The common promotion collection indicator may be the accessed promotion collection indicator described in 206 of FIG. 2. At 311, the standard deviation analysis that is generated at 310 may be associated with the common promotion collection indicator.

When promotion scores are analyzed in accordance to the analysis described in flow chart 206-E above, each promotion collection will have a promotion collection score that is a standard deviation analysis of all promotion scores for promotions within the promotion collection. At 209 in flow chart 200, the comparison of the analysis may comprise comparing or ranking the standard deviation analyses associated with the different program collections. Further, at 210, the promotion collection(s) may be selected based on comparing or ranking the standard deviations. For instance, a predetermined number of promotion collections having a standard deviation that displays the greatest variance from a mean promotion score of promotion scores within the promotion collections may be selected. Alternatively, a predetermined number of promotion collections having a standard deviation that displays the lowest variance from a mean promotion score of promotion scores within the promotion collections may be selected.

Figure 3F:
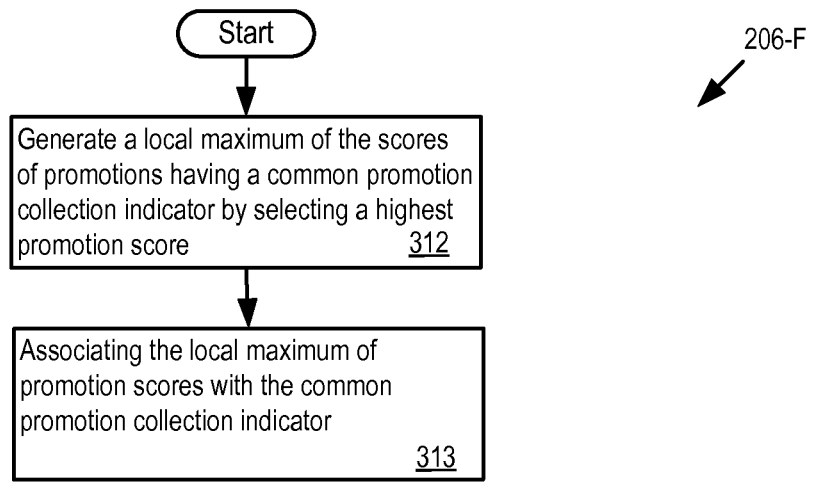
FIG. 3F illustrates a flow chart describing an analysis for generating a deal collection score for a promotion collection.

In FIG. 3F, the flow chart 206-F illustrates the analysis described in 206 of FIG. 2 to be comprised of generating a local maximum value from some (or all) of the promotion scores of promotions having a common promotion collection indicator at 312. The logic 206-F may be implemented in hardware, software, or a combination of both. For example, the promotion scoring model 104 may implement the logic 206-F as software to analyze the promotion scores. The local maximum may be the highest promotion score of a promotion within the promotion collection. The common promotion collection indicator may be the accessed promotion collection indicator described in 206 of FIG. 2. At 312, the local maximum value that is generated at 313 may be associated with the common promotion collection indicator.

When promotion scores are analyzed in accordance to the analysis described in flow chart 206-F above, each promotion collection will have a promotion collection score that is a local maximum of all promotion scores for promotions within the promotion collection. At 209 in flow chart 200, the comparison of the analysis may comprise comparing or ranking the local maximum values associated with the different program collections. Further, at 210, the promotion collection(s) may be selected based on comparing or ranking the local maximum values (e.g., the promotion collections having the greatest local maximums may be selected).

The promotion collection score that may be obtained according to any one of the analyses applied in the flow charts of FIGS. 3A-3F may be referenced as the analysis of promotion scores for each promotion collection in 206 of the flow chart 200 illustrated in FIG. 2.

The analyses of promotion scores described by flow charts 206-A to 206-F are not intended to be exhaustive, and have been provided for illustrative purposes only. Other types of analyses of the promotion scores are contemplated.

Figure 4:
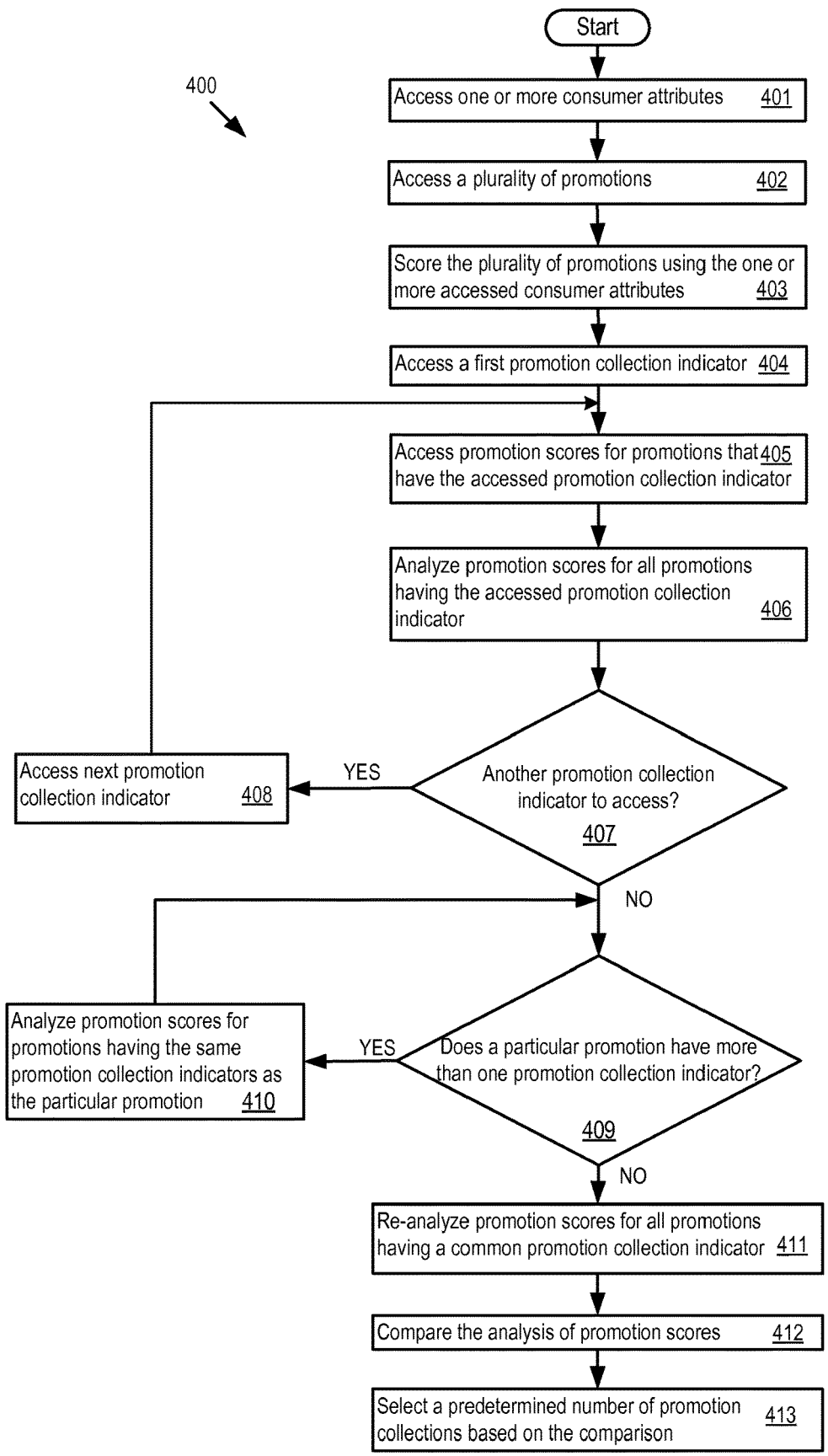
FIG. 4 illustrates a flow chart describing an overview of an analysis of promotion collections.

FIG. 4 illustrates a flow chart 400 to analyze promotion collections, analyze whether a particular promotion is grouped into more than one promotion collection, compare promotion collections and select a predetermined number of promotion collection(s) based on the comparison. The logic 400 may be implemented in hardware, software, or a combination of both. For example, the promotion scoring model 104 may implement the logic 400 as software to determine which promotion collection(s) to present to the consumer.

At 401, one or more consumer attributes are accessed. At 402, a plurality of promotions are accessed. At 403, the plurality of promotions accessed are scored using the one or more accessed consumer attributes.

At 404 a first promotion collection indicator is accessed. As discussed above, program collections may be defined in one of multiple ways. One way is to have a program collection indicator, which may define at least one aspect of the program collection. For example, a promotion collection indicator may be associated with one or more promotions, and may correspond, either in part or in whole, to an attribute of the promotion(s). In this way, a promotion collection indicator may be considered to identify a promotion collection that is comprised of all promotions that have the common promotion collection indicator. For example, a program collection may comprise local deals. In this example, the promotion indicator may comprise an attribute that indicates a promotion is local (such as a geographic indicator).

At 405, promotion scores for promotions in the promotion program offering system 102 that have the promotion collection indicator are accessed. In the above example of a local deals collection (which includes all promotions local to the consumer), the scores for the promotions local to the consumer may be accessed. In one embodiment, the scores for the promotions associated with the promotion collection indicator are already calculated. So that, at 405, the previously calculated scores are accessed. In an alternate embodiment, the scores for the promotions associated with the promotion collection indicator are calculated in response to accessing the promotion collection indicator.

At 406, all promotion scores corresponding to promotions that are determined to have the accessed promotion collection indicator are analyzed. As discussed above, the promotion program offering system 102 is configured to select one or more promotion collections to present to the consumer. In order to make the selection, the promotion program offering system 102 is configured to analyze (such as statistically analyze) the scores of some (or all) of the promotions associated with the promotion program indicator. As discussed in more detail below, the promotion program offering system may then compare the analyses of the different program collections in order to determine which of the different program collections to select. The analysis of promotion scores at 406 may be in accordance to the analyses described in FIGS. 3A-3F with reference to 206 in flow chart 200 above.

At 407 a determination is made as to whether there is another promotion collection indicator to be accessed. If a determination is made that another promotion collection indicator is to be accessed, a next promotion collection indicator is accessed at 408. The flow diagram 400 may then iterate by going to 405. So that, following 408, promotion scores for promotions that have the next promotion collection indicator will be obtained and analyzed in accordance to 405 and 406 as described above.

When it is determined at 407 that there are no longer any promotion collection indicators to access, at 409, the promotion program offering system 102 determines whether a particular promotion has more than one promotion collection indicator. As discussed above, multiple promotion collections may be selected so that promotions in the selected multiple promotion collections may be presented to the consumer. In the event that a promotion is in the selected multiple promotion collections (i.e., the promotion is associated with multiple promotion collections), it may be desirable to avoid a duplicate presentation of the promotion. In this way, 409 is a determination as to whether a particular promotion can be found in more than one promotion collection. If the particular promotion is found to belong to more than one promotion collection, and if the particular promotion will not be presented multiple times (i.e., presented as a promotion as part of a first program collection and presented as a promotion as part of a second program collection), the promotion program offering system 102 may determine which of the program collections not to present the particular promotion. In order to make this determination, at 410, an analysis is performed on promotion scores for all promotions that belong to promotion collections that also include the particular promotion. Generally speaking, the analysis at 410 may determine in which promotion collection removing the particular promotion will have less of an effect.

As a threshold, the analysis may first determine whether the promotion will be displayed in the multiple selected promotion collections. As discussed above, the top ranked promotion in each of the multiple selected promotion collections is displayed. If the same promotion is the top ranked promotion in multiple selected promotion collections, the analysis may proceed. If the same promotion is not the top ranked promotion in multiple selected promotion collections, the analysis may not proceed since the same promotion will not be presented to the consumer.

Further, the analysis in 410 may be performed in multiple ways. For example, the analysis at 410 may comprise analyzing all of the promotion collections that include the particular promotion, and then dis-associating, or removing, the particular promotion from those promotion collections where the removal of the promotion score of the particular promotion will result in the least amount of disruption with respect to the overall promotion scores of the promotion collection. This analysis may consider that the removal of the promotion score of the particular promotion from the promotion collection will result in the least amount of variance when generating a promotion collection score for the promotion collection according to any one of the analyses described in flow charts 206-A to 206-F. The particular promotion may be removed from associated promotion collections in this manner until the promotion collection only remains in a single promotion collection.

Alternatively, the analysis of promotion collections at 410 may parse a promotion collection in order to first determine what the next highest promotion score is following the promotion score of the particular promotion. Then, the particular promotion may be dis-associated, or removed, from all promotion collections that include the particular promotion, except for the one promotion collection where the difference between the promotion score of the particular promotion and the next lowest promotion score is greatest. The particular promotion may then proceed to be dis-associated, or removed, from all promotion collections that include the particular promotion in this manner, until the particular promotion is only left in the one promotion collection where the difference between the promotion score of the particular promotion and the next highest promotion score is greatest.

Once the analysis at 410 is accomplished for all promotions that have more than one promotion collection indicator (i.e., belong to more than one promotion collection), the result will be that all promotions that are processed according to the flow chart 400 will belong to only one promotion collection.

At 411, the promotion score analysis applied at 406 is re-applied to account for any promotions that may have been dis-associated, or removed, at 410.

At 412, the analysis of promotion scores for the different promotion collection indicators is compared. The comparison at 412, which may be similar or the same as 209, may compare a promotion collection score that is generated for each promotion collection at 411. The generation of a promotion collection score may be made according to any one of the analyses described in flow charts 206-A to 206-F above.

At 413, one or more promotion collections may be selected based on the comparison described in 412. For example, a predetermined number of program collections may be selected. The predetermined number may equal one, so that the top ranked program collection is selected for presentation to the consumer. Alternatively, the predetermined number may be greater than one (such as three) so that the three top ranked program collections are selected.

One or more, or all of the promotions from the selected promotion collection(s) from 413 may then be presented to a consumer. In particular, a predetermined number of promotions from the selected promotion collection(s) may be presented to the user. For example, in the instance where a single promotion from each selected promotion collection is presented to the consumer, the promotion program offering system 102 may select the top scored promotion from each selected promotion collection to present to the consumer. As another example, where three promotions from each selected promotion collection is presented to the consumer, the promotion program offering system 102 may select the top three scored promotions from each selected promotion collection to present to the consumer. The one or more promotions from the selected promotion collection(s) may be presented to the consumer via a webpage, a mobile communication message, an email message or other similar form of communication.

Figure 5:
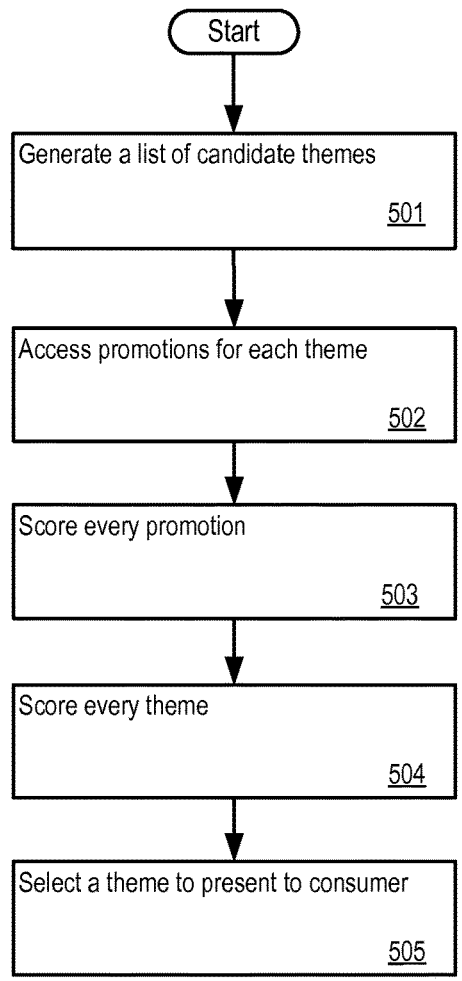
FIG. 5 illustrates a flow chart describing an overview of a process for generating and analyzing themes related to promotions.

FIG. 5 illustrates a flow chart describing a process for generating a list of candidate themes, fetching promotions for each theme, scoring every promotion, scoring every theme, and picking a final theme. The logic 500 may be implemented in hardware, software, or a combination of both. For example, the promotion scoring model 104 may implement the logic 500 as software to select a final theme.

At 501, information from one or more of the databases 110, 112, 114, 116 in the promotion program offering system 102 may be accessed to determine what a consumer likes or has shown interest in. From this determination, a theme may be generated. If there is no specific information about the consumer, a default set of themes are selected.

As one example, the purchase history of the consumer may be used to determine a theme. In particular, the consumer's promotion purchase history may be accessed such that each category, or sub-category, of promotions from which the consumer has purchased may be used to select a theme. In one instance, the consumer may have purchased an Italian restaurant deal. So that, the theme selected may be "Italian restaurants". Alternatively (or in addition), the theme may be selected based on the previously purchased deal. For example, if the consumer purchased an Italian restaurant deal and the number of Italian restaurant deals are below a predetermined number, an alternative theme may be selected (such as "Mediterranean restaurants", which encompass Greek and Italian restaurants).

As another example, the deal types (i.e., personas) that are selected by the consumer may be used to determine the theme. In particular, attributes describing the consumer's profile may also be accessed such that each consumer attribute may be used to select a theme. One attribute of the consumer may comprise "interests" of the consumer, such as interests in Italian restaurants. As still another example, consumer sign-up data may be used to determine a theme. As discussed above, the theme selected may comprise any type of attribute of a deal, such as a category of a deal (e.g., "restaurants"), a sub-category of a deal (e.g., "Italian restaurants"), a location of a deal (e.g., "local deal"), and/or a type of deal (e.g., "travel deal"). The examples given of the themes are merely for illustration purposes only.

If no themes can be generated, a set of universally-liked themes may be referenced and generated. For instance, universally-liked themes may include restaurants, coffee and treats, massages, facials/nails/tanning, activities and other similarly liked themes.

At 502, promotions in the promotion program offering system 102 are matched to corresponding themes that were generated at 501. For example, a bank of deals (such as the second bank of deals discussed above) may be accessed to fetch promotions. If the number of promotions that are matched to a particular theme is less than a predetermined number, promotion purchase history data of the consumer may be accessed from the historical data database 114. From the promotion purchase history data, promotions that are determined to be related to the particular theme via a related category, sub-category or other like attribute, may be matched to the particular theme until at least the predetermined number of promotions are matched to the particular theme. This may be repeated for each theme having less than the predetermined number of promotions matched to it.

At 503, a score is generated for each promotion that has been matched to a theme. The promotion scoring may be accomplished according to any of the promotion scoring methods described throughout this disclosure.

At 504, a score is generated for each theme. The theme scoring may be accomplished according to any of the scoring methods described with relation to the scoring of promotion collections in this disclosure. For example, the top three scores for a particular theme may be summed to generate the score for the particular theme. For instance, an "Italian restaurant" theme may have 10 deals, with the sum of the top three scores comprising the score for the "Italian restaurant" theme. In some embodiments, if a theme has previously been presented to the consumer within a predetermined amount of time, the theme will be assigned the lowest possible score (e.g., a score of zero).

At 505, a theme is selected from amongst the generated themes to present to the consumer. The selected theme may have the highest score. For example, multiple themes may be scored so that the theme with the highest score is selected. In some embodiments, the selected theme may be required to have a score that surpasses a minimum threshold.

The selected theme may be presented to the consumer via an e-mail communication. The e-mail may include additional information identifying the theme, and a description for how the theme was generated. The e-mail may additionally include information identifying the consumer's past promotion purchasing history if the consumer's past promotion purchasing history was accessed when generating the theme. The e-mail may additionally include information identifying a deal type if the deal type was referenced when generating the theme. The e-mail may additionally include information identifying a universally liked theme if the universally liked theme was referenced when generating the theme.

A promotion or a theme may be removed from consideration for several reasons. First, a promotion or a theme may be removed depending on previous actions. For example, the promotion offering system may have previously sent a promotion or a theme to a consumer. In one embodiment, the promotion offering system is configured to determine a time period when the promotion or the theme was last sent to the consumer. If the time period is less than a predetermined time, the promotion or the theme is removed from consideration. As one example, if a consumer has received promotions from a particular theme within 30 days, the promotion offering system will not send promotions with the same particular theme.

When sending promotions or themes to consumer, the promotion offering system may store in a database the promotions and/or the themes sent to the consumer. In this way, the promotion offering system may access the database in order to determine whether a promotion or a theme has been send within a predetermined period.

Further, when sending a communication with the promotions or themes to the consumer, the communication may include the theme of the collection (such as "local favorites") and may include a reason for sending the collection (if applicable). As one example, if purchase history was the reason behind the collection, the email will say something like, "We are sending you this special collection of deals because you purchased XYZ". As another example, if a deal type was the reason behind the collection, the email will say something like, "We are sending you this special collection of deals matching XYZ" where XYZ is the deal type. As still another example, if a universal theme was chosen, the email may say something like, "Here is a special collection of coffee & treats deals."

Figure 6:
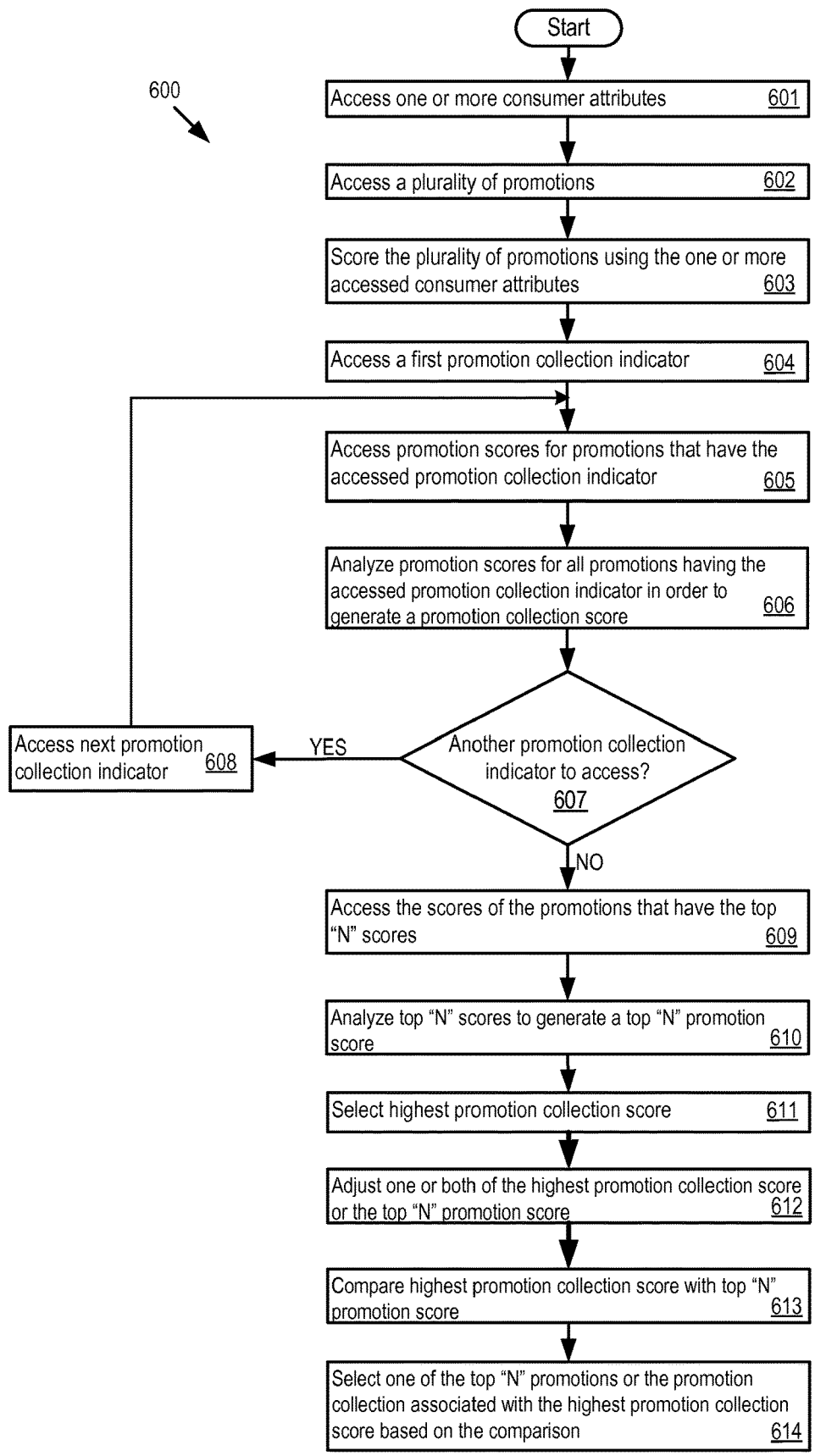
FIG. 6 illustrates a flow chart describing an analysis of a promotion collection and an analysis of disparate promotions (such as the top "N" ranked promotions) in order to select one of the promotion collection or the disparate promotions to present to the consumer.

FIG. 6 illustrates a flow chart 600 describing an analysis of a promotion collection and an analysis of disparate promotions (such as the top "N" ranked promotions) in order to select one of the promotion collection or the disparate promotions to present to the consumer. The logic 600 may be implemented in hardware, software, or a combination of both. For example, the promotion scoring model 104 may implement the logic 600 as software to select whether to present promotion collection(s) or disparate promotions to the consumer.

At 601, one or more consumer attributes are accessed. At 602, a plurality of promotions are accessed. At 603, the plurality of promotions are scored using the one or more accessed consumer attributes. At 604, a first promotion collection indicator is accessed. As discussed above, the promotion collection indicator may be determined in one of several ways. At 605, the promotion scores associated with the accessed promotion collection indicator are access, and at 606 analyzed to generate a promotion collection score. Any of the analyses of the scores discussed herein may be used. At 607, it is determined whether there is another promotion collection indicator to access, and if so, at 608, the next promotion collection indicator is accessed and flow chart 600 loops back to 605.

Disparate promotions may likewise be scored. One example of disparate promotions is the top "N" promotions by score. At 609, the scores of the promotions that are the highest "N" ranked promotions are accessed. At 610, the top "N" scores are analyzed to generate a disparate promotion score, such as a top "N" promotion score. Any of the analyses of the scores discussed herein may be used.

At 611, the highest promotion collection score is selected. At 612, one, or both, of the disparate promotion score or the highest promotion collection score may be adjusted prior to comparison at 613. As one example, the promotion program offering system 102 may adjust (e.g., increase) the highest promotion collection score. The amount of the adjustment of the highest promotion collection score may be fixed or may vary. For example, the amount may vary depending on the promotion collection, depending on one or more attributes of the consumer, or both. As another example, the promotion program offering system 102 may adjust (e.g., decrease) the disparate promotion score.

At 613, the comparison may be performed (e.g., comparison of the adjusted highest promotion collection score with the top "N" promotion score; comparison of the promotion collection score with the adjusted top "N" promotion score).

At 614, one of the disparate promotions or the promotion collection associated with the highest promotion collection score is selected based on the comparison at 613.

Alternatively, the promotion program offering system 102 may determine whether the highest promotion collection score is within a range of the top "N" promotion score. If the highest promotion collection score is within the range of the top "N" promotion score, some or all of the promotions in the highest promotion collection are presented to the consumer; otherwise, the disparate promotions are presented to the consumer. As discussed above, the range may be fixed or may vary.

Figure 7:
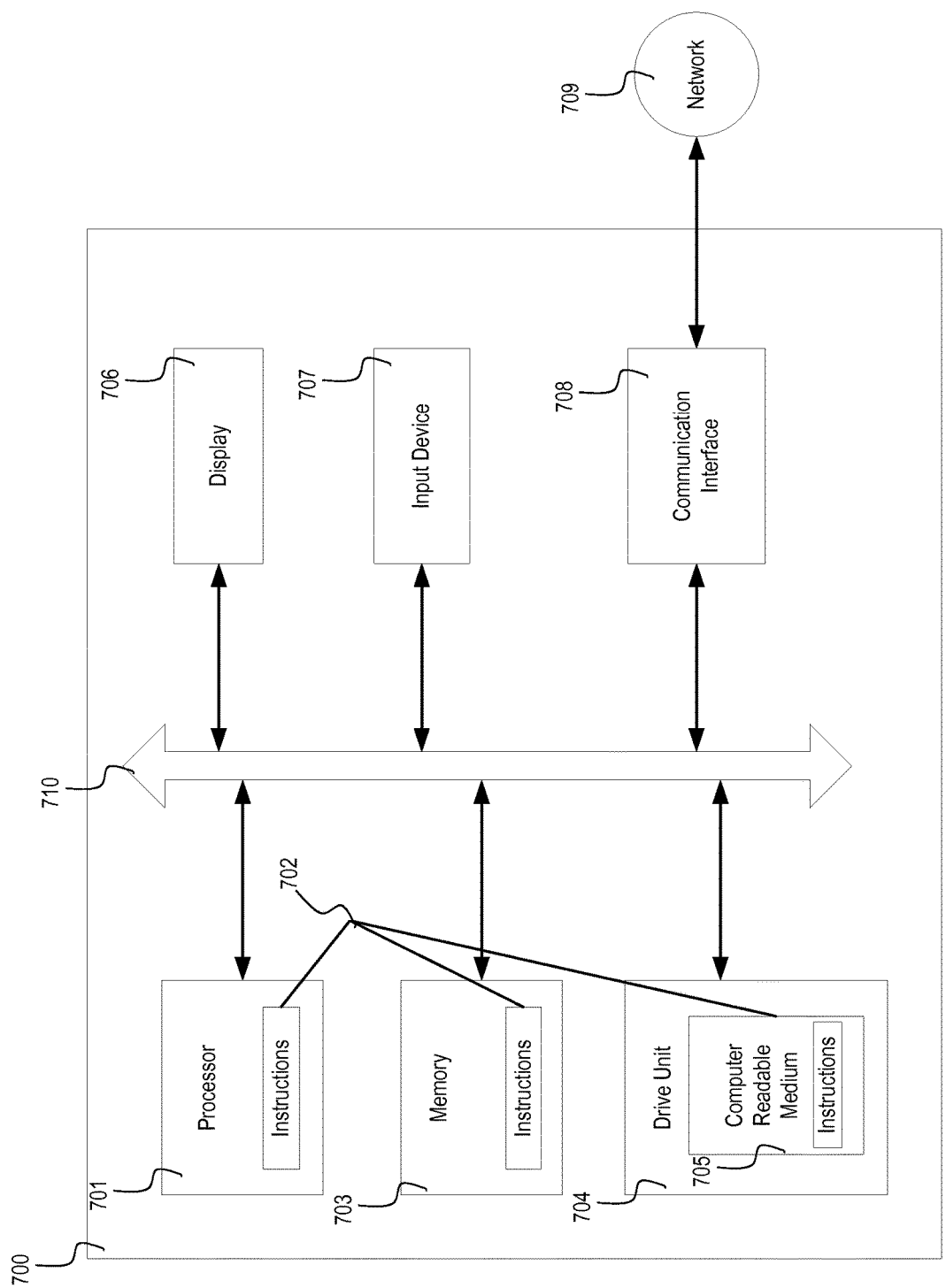
FIG. 7 is a general computer system, programmable to be a specific computer system, which may represent any of the computing devices referenced herein.

FIG. 7 illustrates a general computer system 700, programmable to be a specific computer system 700, which can represent any server, computer or component, such as consumer 1 (124), consumer N (126), merchant 1 (118), merchant M (120), and promotion program offering system 102. The computer system 700 may include an ordered listing of a set of instructions 702 that may be executed to cause the computer system 700 to perform any one or more of the methods or computer-based functions disclosed herein. The computer system 700 can operate as a stand-alone device or can be connected, e.g., using the network 122, to other computer systems or peripheral devices.

In a networked deployment, the computer system 700 can operate in the capacity of a server or as a client-user computer in a server-client user network environment, or as a peer computer system in a peer-to-peer (or distributed) network environment. The computer system 700 may also be implemented as or incorporated into various devices, such as a personal computer or a mobile computing device capable of executing a set of instructions 702 that specify actions to be taken by that machine, including and not limited to, accessing the Internet or Web through any form of browser. Further, each of the systems described can include any collection of sub-systems that individually or jointly execute a set, or multiple sets, of instructions to perform one or more computer functions.

The computer system 700 can include a memory 703 on a bus 710 for communicating information. Code operable to cause the computer system to perform any of the acts or operations described herein can be stored in the memory 703. The memory 703 may be a random-access memory, read-only memory, programmable memory, hard disk drive or any other type of volatile or non-volatile memory or storage device.

The computer system 700 can include a processor 701, such as a central processing unit (CPU) and/or a graphics processing unit (GPU). The processor 701 may include one or more general processors, digital signal processors, application specific integrated circuits, field programmable gate arrays, digital circuits, optical circuits, analog circuits, combinations thereof, or other now known or later-developed devices for analyzing and processing data. The processor 701 may implement the set of instructions 702 or other software program, such as manually programmed or computer-generated code for implementing logical functions. The logical function or any system element described can, among other functions, process and convert an analog data source such as an analog electrical, audio, or video signal, or a combination thereof, to a digital data source for audio-visual purposes or other digital processing purposes such as for compatibility for computer processing.

The computer system 700 can also include a disk or optical drive unit 704. The disk drive unit 704 may include a computer-readable medium 705 in which one or more sets of instructions 702, e.g., software, may be embedded. Further, the instructions 702 may perform one or more of the operations as described herein. The instructions 702 may reside completely, or at least partially, within the memory 703 or within the processor 701 during execution by the computer system 700. Accordingly, the databases 110, 112, 114, or 116 may be stored in the memory 703 or the disk unit 704.

The memory 703 and the processor 701 also may include computer-readable media as discussed above. A "computer-readable medium," "computer-readable storage medium," "machine readable medium," "propagated-signal medium," or "signal-bearing medium" may include any device that has, stores, communicates, propagates, or transports software for use by or in connection with an instruction executable system, apparatus, or device. The machine-readable medium may selectively be, but not limited to, an electronic, magnetic, optical, electromagnetic, infrared, or semiconductor system, apparatus, device, or propagation medium.

Additionally, the computer system 700 may include an input device 707, such as a keyboard or mouse, configured for a user to interact with any of the components of system 700. It may further include a display 706, such as a liquid crystal display (LCD), a cathode ray tube (CRT), or any other display suitable for conveying information. The display 706 may act as an interface for the user to see the functioning of the processor 701, or specifically as an interface with the software stored in the memory 703 or the drive unit 704.

The computer system 700 may include a communication interface 708 that enables communications via the communications network 122. The network 122 may include wired networks, wireless networks, or combinations thereof. The communication interface 708 network may enable communications via any number of communication standards, such as 802.11, 802.17, 802.20, WiMax, 802.15.4, cellular telephone standards, or other communication standards, as discussed above. Simply because one of these standards is listed does not mean any one is preferred.

Further, the promotion program offering system 102, as depicted in FIG. 1 may comprise one computer system or multiple computer systems. Further, the flow diagrams illustrated in FIGS. 2-6 may use computer readable instructions that are executed by one or more processors in order to implement the functionality disclosed.

The present disclosure contemplates a computer-readable medium that includes instructions or receives and executes instructions responsive to a propagated signal, so that a device connected to a network can communicate voice, video, audio, images or any other data over the network. Further, the instructions can be transmitted or received over the network via a communication interface. The communication interface can be a part of the processor or can be a separate component. The communication interface can be created in software or can be a physical connection in hardware. The communication interface can be configured to connect with a network, external media, the display, or any other components in system, or combinations thereof. The connection with the network can be a physical connection, such as a wired Ethernet connection or can be established wirelessly as discussed below. In the case of a service provider server, the service provider server can communicate with users through the communication interface.

The computer-readable medium can be a single medium, or the computer-readable medium can be a single medium or multiple media, such as a centralized or distributed database, or associated caches and servers that store one or more sets of instructions. The term "computer-readable medium" can also include any medium that can be capable of storing, encoding or carrying a set of instructions for execution by a processor or that can cause a computer system to perform any one or more of the methods or operations disclosed herein.

The computer-readable medium can include a solid-state memory such as a memory card or other package that houses one or more non-volatile read-only memories. The computer-readable medium also may be a random access memory or other volatile re-writable memory. Additionally, the computer-readable medium may include a magneto-optical or optical medium, such as a disk or tapes or other storage device to capture carrier wave signals such as a signal communicated over a transmission medium. A digital file attachment to an email or other self-contained information archive or set of archives may be considered a distribution medium that may be a tangible storage medium. The computer-readable medium is preferably a tangible storage medium. Accordingly, the disclosure may be considered to include any one or more of a computer-readable medium or a distribution medium and other equivalents and successor media, in which data or instructions can be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The methods described herein may be implemented by software programs executable by a computer system. Further, implementations may include distributed processing, component/object distributed processing, and parallel processing. Alternatively or in addition, virtual computer system processing may be constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments can be apparent to those of skill in the art upon reviewing the disclosure. Other embodiments can be utilized and derived from the disclosure, such that structural and logical substitutions and changes can be made without departing from the scope of the disclosure. Additionally, the illustrations are merely representational and cannot be drawn to scale. Certain proportions within the illustrations may be exaggerated, while other proportions may be minimized. Accordingly, the disclosure and the figures are to be regarded as illustrative rather than restrictive.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

What is claimed is:

1. A computer-implemented method for selecting one of a first promotion collection or second promotion collection to offer to a consumer in order to increase the probability that the consumer will purchase at least one of the promotions in the offered promotion collection, the method comprising:

transmitting, by a processor, an electronic interface of a promotion offering system to a remote computer associated with the consumer;

receiving, by the processor and via a transmission medium from the remote computer, a communication indicating an interaction with the electronic interface by the remote computer associated with the consumer;

in response to receiving the communication, retrieving, by the processor and from a consumer profiles database associated with a promotion program offering system configured to offer promotions for promotion programs, a plurality of attributes associated with the consumer, wherein the plurality of attributes of the consumer are derived from consumer interaction data and location data, wherein the consumer interaction data is associated with one or more consumer interactions with the promotion offering system, and wherein the location data comprises real-time latitude and longitude coordinates associated with the remote computer;

retrieving, by the processor and from a promotion programs database, a plurality of promotions available for purchase, wherein each of the promotions is offered for purchase to consumers for use toward at least part of the purchase of a product or a service provided by a merchant, wherein the first promotion collection comprises a first plurality of promotions and is a first subset of promotions of the plurality of promotions that each share a first promotion attribute set, wherein the second promotion collection comprises a second plurality of promotions and is a second subset of promotions of the plurality of promotions that each share a second promotion attribute set, wherein the first promotion attribute set comprises at least a first promotion location, a first promotion category, and a first promotion subcategory and the second promotion attribute set comprises at least a second promotion location, a second promotion category, and a second promotion subcategory;

generating a promotion score for each promotion of the plurality of promotions specific to the consumer, by the processor and based on the plurality of attributes of the consumer, the location data associated with the remote computer associated with the consumer, and an associated promotion location for the promotion, wherein each promotion score is calculated using a scoring model, specific to the consumer, and is representative of a predicted likelihood that the consumer will purchase the promotion;

generating, by the processor, a first promotion collection score based on the promotion scores of corresponding promotions in the first promotion collection having a first promotion collection indicator;

generating, by the processor, a second promotion collection score based on the promotion scores of corresponding promotions in the second promotion collection having a second promotion collection indicator, wherein the first promotion collection indicator and the second promotion collection indicator indicate distinct geographic areas, and wherein the first promotion collection score and the second promotion collection score are generated by at least one of i) generating a mean value for the first promotion collection score associated with the first promotion attribute set and the second promotion collection score associated with the second promotion attribute set, ii) generating a first median value for a first subset of scores of the promotions in the first subset associated with the first promotion attribute set and a second median value for a second subset of scores of the promotions in the second subset associated with the second promotion attribute set, or iii) generating a first standard deviation value for the first subset of scores of the promotions in the first subset associated with the first promotion attribute set and a second standard deviation value for the second subset of scores of the promotions in the second subset associated with the second promotion attribute set;

adjusting one or more of the first promotion collection score or the second promotion collection score based at least in part on emails the consumer has opened, links the consumer has accessed in electronic communications, searches the consumer has performed via the electronic interface of the promotion offering system, or webpages accessed by the consumer;

upon determining that the first promotion collection and the second promotion collection each comprises at least a minimum threshold number of promotions, comparing, by the processor, the first promotion collection score with the second promotion collection score;

selecting, by the processor, a subset of the promotions from one of either the first promotion collection or the second promotion collection to offer for purchase to the consumer based on the comparison of the first promotion collection score with the second promotion collection score;

filtering, by the processor, the subset of the promotions based at least in part on a promotion theme and a predefined number of promotions to be presented to the consumer to generate a filtered subset of the promotions comprising a top N promotions of the subset of promotions associated having highest promotion scores in relation to remaining promotions of the subset of promotions; and transmitting, by the processor and to the remote computer, an electronic communication comprising data associated with the filtered set of the promotions filtered based on the promotion theme, wherein the electronic communication is configured to facilitate real-time rendering of the data associated with the filtered set of the promotions via electronic interface of the remote computer.

2. The method of claim 1, wherein generating the first promotion collection score comprises generating, by the processor, the first promotion collection score based on the scores of less than all of the promotions in the first subset; and wherein generating the second promotion collection score comprises generating, by the processor, the second promotion collection score based on the scores of less than all of the promotions in the second subset.

3. The method of claim 2, wherein generating the first promotion collection score based on the scores of less than all of the promotions in the first subset comprises:

selecting, by the processor, N promotions from the first subset, the N promotions comprising N highest scores from the first subset, where N is a predetermined number; and generating, by the processor, a mean of the scores associated with the N promotions from the first subset, the mean comprising the first promotion collection score, wherein generating the second promotion collection score based on the scores of less than all of the promotions in the second subset comprises:

selecting, by the processor, N promotions from the second subset, the N promotions comprising N highest scores from the second subset; and generating, by the processor, a mean of the scores associated with the N promotions from the second subset, the mean comprising the second promotion collection score.

4. The method of claim 3, wherein selecting the subset of the promotions comprises:

selecting, by the processor, a promotion collection with a higher mean of promotion collection scores.

5. The method of claim 4, wherein the first promotion collection comprises the N promotions from the first subset; and wherein the second promotion collection comprises the N promotions from the second subset.

6. The method of claim 2, wherein generating the first promotion collection score comprises generating, by the processor, the first promotion collection score based on the scores of all of the promotions in the first subset; and wherein generating the second promotion collection score comprises generating, by the processor, the second promotion collection score based on the scores of all of the promotions in the second subset.

7. The method of claim 2, wherein generating the first promotion collection score comprises generating, by the processor, a sum of the scores of some or all of the promotions in the first subset; and wherein generating the second promotion collection score comprises generating a sum of the scores of some or all of the promotions in the second subset.

8. The method of claim 7, wherein generating the first promotion collection score further comprises applying, by the processor, a greater weight to higher scoring promotion scores prior to summing the scores of some or all of the promotions in the first subset.

9. The method of claim 2, wherein generating the first promotion collection score comprises generating, by the processor, a median or a standard deviation of the scores of all the promotions in the first subset; and wherein generating the second promotion collection score comprises generating, by the processor, a median or a standard deviation of the scores of all the promotions in the second subset.

10. The method of claim 1, further comprising selecting, by the processor, the first promotion attribute set and the second promotion attribute set based on input from the consumer.

11. A computer-implemented method for determining whether to select a promotion collection or to select disparate promotions to offer to a consumer in order to increase the probability that the consumer will purchase at least one of the offered promotions, each of the promotions in the promotion collection including a shared promotion attribute set, wherein the shared promotion attribute set comprises at least a promotion location, a promotion category, and a promotion subcategory, the method comprising:

transmitting, by a processor, an electronic interface of a promotion offering system to a remote computer associated with the consumer;

receiving, by the processor and via a transmission medium from the remote computer, a communication indicating an interaction with the electronic interface by the remote computer associated with the consumer;

in response to receiving the communication received via a transmission medium indicating an interaction with the electronic interface, retrieving, by the processor and from a consumer profiles database associated with a promotion program offering system configured to offer promotions for promotion programs, a plurality of attributes associated with the consumer, wherein the plurality of attributes of the consumer are derived from consumer interaction data and location data, wherein the consumer interaction data is associated with one or more consumer interactions with the promotion offering system, and wherein the location data comprises real-time latitude and longitude coordinates associated with the remote computer;

retrieving, by the processor and from a promotion programs database by the promotion program offering system, a plurality of promotions available for purchase, wherein each of the promotions is offered for purchase to consumers for use toward at least part of the purchase of a product or a service provided by a merchant, and wherein the promotion collection comprises a first plurality of promotions and is a first subset of the plurality of promotions that share the promotion attribute set and wherein a second subset comprising a second plurality of promotions of the plurality of promotions includes the disparate promotions;

generating a promotion score for each promotion of the plurality of promotions, by the processor and based on the plurality of attributes of the consumer, the location data for the remote computer associated with the customer, and the promotion location, wherein each promotion score is calculated using a scoring model, specific to the consumer, and is representative of a predicted likelihood that the consumer will purchase the promotion;

generating, by the processor, a first promotion collection score based on the promotion scores of the promotions in the promotion collection;

generating, by the processor, a disparate promotion score based on the promotion scores of the disparate promotions, wherein the first promotion collection score and the disparate promotion collection score are generated by at least one of i) generating a mean value for the first promotion collection score associated with the first plurality of promotions and the disparate promotion collection score associated with the second plurality of promotions, ii) generating a first median value for a first subset of scores of the promotions in the first subset associated with the first plurality of promotions and a second median value for a second subset of scores of the promotions in the second subset associated with the second plurality of promotions, and iii) generating a first standard deviation value for the first subset of scores of the promotions in the first subset associated with the first plurality of promotions and a second standard deviation value for the second subset of scores of the promotions in the second subset associated with the second plurality of promotions;

adjusting one or more of the first promotion collection score or the second promotion collection score based at least in part on emails the consumer has opened, links the consumer has accessed in electronic communications, searches the consumer has performed via the electronic interface of the promotion offering system, or webpages accessed by the consumer;

upon determining that the first promotion collection and the second promotion collection each comprises at least a minimum threshold number of promotions, comparing, by the processor, the promotion collection score with the disparate promotion score;

selecting, by the processor, a subset of the promotions from either one of the collection of promotions or one or more of the disparate promotions to offer for purchase to the consumer based on the comparison of the promotion collection score with the disparate promotion score;

filtering, by the processor, the subset of the promotions based at least in part on a promotion theme and a predefined number of promotions to be presented to the consumer to generate a filtered subset of the promotions comprising a top N promotions of the subset of promotions associated having highest promotion scores in relation to remaining promotions of the subset of promotions; and transmitting, by the processor and to the remote computer, an electronic communication comprising data associated with the filtered set of the promotions filtered based on the promotion theme, wherein the electronic communication is configured to facilitate real-time rendering of the data associated with the filtered set of the promotions via electronic interface of the remote computer.

12. The method of claim 11, wherein the disparate promotions comprise N promotions with N highest scores from the scores of the plurality of promotions, wherein N is a predetermined number.

13. The method of claim 12, wherein generating the promotion collection score based on the scores of some or all the promotions in the first subset comprises:

selecting, by the processor, N promotions from the first subset, the N promotions comprising N highest scores from the first subset; and calculating, by the processor, the promotion collection score based on the N promotions from the first subset.

14. The method of claim 13, wherein calculating the promotion collection score based on the N promotions from the first subset comprises calculating, by the processor, a mean of the scores associated with the N promotions from the first subset, the mean comprising the promotion collection score; and wherein generating the disparate promotion score based on the scores of some or all the disparate promotions comprises calculating, by the processor, a mean of the scores associated with the N promotions with N highest scores, the mean comprising the disparate promotion score.

15. The method of claim 13, wherein comparing the promotion collection score with the disparate promotion score comprises comparing, by the processor, whether the promotion collection score is within a predetermined range of the disparate promotion score.

16. A promotion program offering system configured to select one of a first promotion collection or second promotion collection to offer to a consumer in order to increase the probability that the consumer will purchase at least one of the promotions in the offered promotion collection, the system comprising:

a memory storing processor-executable instructions; and a processor in communication with the memory, where the processor is configured to execute the processor-executable instructions to:

transmit an electronic interface of a promotion offering system a remote computer associated with the consumer;

receive, via a transmission medium from the remote computer, a communication indicating an interaction with the electronic interface by the remote computer associated with the consumer;

in response to receiving the communication received via a transmission medium indicating an interaction with the electronic interface, retrieve, from a consumer profiles database associated with the promotion program offering system, a plurality of attributes associated with the consumer, wherein the plurality of attributes of the consumer are derived from consumer interaction data and location data, wherein the consumer interaction data is associated with one or more consumer interactions with the promotion offering system, and wherein the location data comprises real-time latitude and longitude coordinates associated with the remote computer;

retrieve, from a promotion programs database associated with the promotion program offering system, a plurality of promotions available for purchase, wherein each of the promotions is offered for purchase to consumers for use toward at least part of the purchase of a product or a service provided by a merchant, and wherein the first promotion collection comprises a first plurality of promotions and is a first subset of the plurality of promotions that share a first promotion attribute set and the second promotion collection comprises a second plurality of promotions and is a second subset of the plurality of promotions that share a second promotion attribute set, wherein the first promotion attribute set comprises at least a first promotion location, a first promotion category, and a first promotion subcategory and the second promotion attribute set comprises at least a second promotion location, a second promotion category, and a second promotion subcategory;

generate a promotion score each promotion of the plurality of promotions, based on the plurality of attributes of the consumer, the location data for the remote computer associated with the customer, and respective promotion location associated with the promotion, wherein each promotion score is calculated using a scoring model, specific to the consumer, and is representative of a predicted likelihood that the consumer will purchase the promotion;

generate a first promotion collection score based on the promotion scores of corresponding promotions in the first promotion collection having a first promotion collection indicator;

generate a second promotion collection score based on the promotion scores of corresponding promotions in the second promotion collection having a second promotion collection indicator, wherein the first promotion collection indicator and the second promotion collection indicator indicate distinct geographic areas and wherein the first promotion collection score and the second promotion collection score are generated by at least one of i) generating a mean value for the first promotion collection score associated with the first promotion attribute set and the second promotion collection score associated with the second promotion attribute set, ii) generating a first median value for a first subset of scores of the promotions in the first subset associated with the first promotion attribute set and a second median value for a second subset of scores of the promotions in the second subset, and iii) generating a first standard deviation value for the first subset of scores of the promotions in the first subset associated with the first promotion attribute set and a second standard deviation value for the second subset of scores of the promotions in the second subset associated with the second promotion attribute set;

adjusting one or more of the first promotion collection score or the second promotion collection score based at least in part on emails the consumer has opened, links the consumer has accessed in electronic communications, searches the consumer has performed via the electronic interface of the promotion offering system, or webpages accessed by the consumer;

upon determining that the first promotion collection and the second promotion collection each comprises at least a minimum threshold number of promotions, compare the first promotion collection score with the second promotion collection score;

select, by the promotion program offering system, a subset of the promotions from one of the first promotion collection or the second promotion collection to offer for purchase to the consumer based on the comparison of the first promotion collection score with the second promotion collection score;

filter the subset of the promotions based at least in part on a promotion theme and a predefined number of promotions to be presented to the consumer to generate a filtered subset of the promotions comprising a top N promotions of the subset of promotions associated having highest promotion scores in relation to remaining promotions of the subset of promotions; and transmit, to the remote computer, an electronic communication comprising data associated with the filtered set of the promotions filtered based on the promotion theme, wherein the electronic communication is configured to facilitate real-time rendering of the data associated with the filtered set of the promotions via electronic interface of the remote computer.

17. The system of claim 16, wherein the processor is configured to generate the first promotion collection score by generating the first promotion collection score based on the scores of less than all of the promotions in the first subset; and wherein the processor is configured to generate the second promotion collection score by generating the second promotion collection score based on the scores of less than all of the promotions in the second subset.

18. The system of claim 17, wherein the processor is configured to generate the first promotion collection score based on the scores of less than all of the promotions in the first subset by:

selecting N promotions from the first subset, the N promotions comprising N highest scores from the first subset, where N is a predetermined number; and generating a mean of the scores associated with the N promotions from the first subset, the mean comprising the first promotion collection score, wherein the processor is configured to generate the second promotion collection score based on the scores of less than all of the promotions in the second subset by:

selecting N promotions from the second subset, the N promotions comprising N highest scores from the second subset; and generating a mean of the scores associated with the N promotions from the second subset, the mean comprising the second promotion collection score.

19. The system of claim 18, wherein the processor is configured to select the subset of the promotions by:

selecting a promotion collection with a higher mean of promotion collection scores.

20. The system of claim 19, wherein the first promotion collection comprises the N promotions from the first subset; and wherein the second promotion collection comprises the N promotions from the second subset.

21. The system of claim 17, wherein the processor is configured to generate the first promotion collection score by generating the first promotion collection score based on the scores of all of the promotions in the first subset; and wherein the processor is configured to generate the second promotion collection score by generating the second promotion collection score based on the scores of all of the promotions in the second subset.

22. The system of claim 17, wherein the processor is configured to generate the first promotion collection score by generating a sum of the scores of some or all of the promotions in the first subset; and wherein the processor is configured to generate the second promotion collection score by generating a sum of the scores of some or all of the promotions in the second subset.

23. The system of claim 22, wherein the processor is configured to generate the first promotion collection score by applying a greater weight to higher scoring promotion scores prior to summing the scores of some or all of the promotions in the first subset.

24. The system of claim 17, wherein the processor is configured to generate the first promotion collection score by generating a median or a standard deviation of the scores of all the promotions in the first subset; and wherein the processor is configured to generate the second promotion collection score by generating a median or a standard deviation of the scores of all the promotions in the second subset.

25. The system of claim 16, wherein the processor is further configured to select the first promotion attribute set and the second promotion attribute set based on input from the consumer.

26. A promotion program offering system configured to determine whether to select a promotion collection or to select disparate promotions to offer to a consumer in order to increase the probability that the consumer will purchase at least one of the offered promotions, each of the promotions in the promotion collection including a shared promotion attribute set, wherein the shared promotion attribute set comprises at least a promotion location, a promotion category, and a promotion subcategory, the system comprising:
- a memory storing processor-executable instructions; and
- a processor in communication with the memory, where the processor is configured to execute the processor-executable instructions to:
- transmit an electronic interface of a promotion offering system to a remote computer associated with the consumer;
- receive, via a transmission medium from the remote computer, a communication indicating an interaction with the electronic interface by the remote computer associated with the consumer;
- in response to receiving the communication, retrieve, from a consumer profiles database associated with the promotion program offering system, a plurality of attributes of the consumer, wherein the plurality of attributes of the consumer are derived from consumer interaction data and location data, wherein the consumer interaction data is associated with one or more consumer interactions with the promotion offering system, and wherein the location data comprises real-time latitude and longitude coordinates associated with the remote computer;
- retrieve, from a promotion programs database associated with the promotion program offering system, a plurality of promotions available for purchase, wherein each of the promotions is offered for purchase to consumers for use toward at least part of the purchase of a product or a service provided by a merchant, and wherein the promotion collection comprises a first plurality of promotions and is a first subset of the plurality of promotions that share the promotion attribute set and a second subset comprising a second plurality of promotions of the plurality of promotions includes the disparate promotions;
- generate a promotion score each promotion of the plurality of promotions, based on the plurality of attributes of the consumer, the location data for the remote computer associated with the customer, and the promotion location, wherein each promotion score is calculated using a scoring model, specific to the consumer, and is representative of a predicted likelihood that the consumer will purchase the promotion;
- generate a promotion collection score based on the promotion scores of the promotions in the promotion collection; wherein the first promotion collection score and the second promotion collection score are generated by at least one of i) generating a mean value for the first promotion collection score associated with the first plurality of promotions and the second promotion collection score associated with the second plurality of promotions, ii) generating a first median value for a first subset of scores of the promotions in the first subset associated with the first plurality of promotions and a second median value for a second subset of scores of the promotions in the second subset associated with the second plurality of promotions, and iii) generating a first standard deviation value for the first subset of scores of the promotions in the first subset associated with the first plurality of promotions and a second standard deviation value for the second subset of scores of the promotions in the second subset associated with the second plurality of promotions;
- generate a disparate promotion score based on the promotion scores of the disparate promotions;
- compare the promotion collection score with the disparate promotion score;
- select a subset of the promotions from one of the collection of promotions or one or more of the disparate promotions to offer for purchase to the consumer based on the comparison of the promotion collection score with the disparate promotion score;
- filter the subset of the promotions based on a promotion theme to generate a filtered subset of the promotions; and
- transmit, to the remote computer, an electronic communication comprising data associated with the filtered set of the promotions filtered based on the promotion theme, wherein the electronic communication is configured to facilitate real-time rendering of the data associated with the filtered set of the promotions via electronic interface of the remote computer.

27. The system of claim 26, wherein the disparate promotions comprise N promotions with N highest scores from the scores of the plurality of promotions, wherein N is a predetermined number.

28. The system of claim 27, wherein the processor is configured to generate the promotion collection score based on the scores of some or all the promotions in the first subset by:
- selecting N promotions from the first subset, the N promotions comprising N highest scores from the first subset; and
- calculating the promotion collection score based on the N promotions from the first subset.

29. The system of claim 28, wherein the processor is configured to calculate the promotion collection score based on the N promotions from the first subset by calculating a mean of the scores associated with the N promotions from the first subset, the mean comprising the promotion collection score; and
- wherein the processor is configured to generate the disparate promotion score based on the scores of some or all the disparate promotions by calculating a mean of the scores associated with the N promotions with N highest scores, the mean comprising the disparate promotion score.

30. The system of claim 28, wherein the processor is configured to compare the promotion collection score with the disparate promotion score by comparing whether the promotion collection score is within a predetermined range of the disparate promotion score.

* * * * *